(12) United States Patent
Kossak

(10) Patent No.: US 11,205,864 B2
(45) Date of Patent: Dec. 21, 2021

(54) GROUNDING PIPE CLAMP

(71) Applicant: Panduit Corp., Tinley Park, IL (US)

(72) Inventor: Robert W. Kossak, Lemont, IL (US)

(73) Assignee: Panduit Corp., Tinley Park, IL (US)

(*) Notice: Subject to any disclaimer, the term of this patent is extended or adjusted under 35 U.S.C. 154(b) by 0 days.

(21) Appl. No.: 16/991,271

(22) Filed: Aug. 12, 2020

(65) Prior Publication Data
US 2021/0050678 A1 Feb. 18, 2021

Related U.S. Application Data

(60) Provisional application No. 62/887,241, filed on Aug. 15, 2019.

(51) Int. Cl.
*H01R 4/42* (2006.01)
*F16L 55/00* (2006.01)

(52) U.S. Cl.
CPC .............. *H01R 4/42* (2013.01); *F16L 55/00* (2013.01)

(58) Field of Classification Search
CPC . H01R 4/42; H01R 4/643; H01R 4/38; H01R 11/26; F16L 3/1091; F16L 3/227; F16L 55/00
See application file for complete search history.

(56) References Cited

U.S. PATENT DOCUMENTS

| | | |
|---|---|---|
| 1,509,022 A | 7/1923 | Noble |
| 1,547,065 A | 1/1925 | Noble |
| 3,340,581 A | 9/1967 | Engman et al. |
| 3,633,254 A | 1/1972 | Hoglund et al. |
| 3,892,455 A | 7/1975 | Sotolongo |
| 3,901,577 A * | 8/1975 | Philibert ............... H01R 4/643 439/804 |
| 3,913,188 A | 10/1975 | Grassi |
| 3,988,052 A | 10/1976 | Mooney et al. |
| 3,998,562 A | 12/1976 | Gostling |
| 4,010,504 A | 3/1977 | Griffin |
| 4,079,481 A | 3/1978 | Cacicedo |
| 4,114,977 A | 9/1978 | Polidori |
| 4,457,577 A | 7/1984 | Browne et al. |
| 4,506,418 A | 3/1985 | Viola et al. |
| 4,776,808 A | 10/1988 | Davidson |
| 5,152,701 A | 10/1992 | Polidori |
| 5,281,761 A | 1/1994 | Woo et al. |
| 5,320,565 A | 6/1994 | Polidori |

(Continued)

FOREIGN PATENT DOCUMENTS

EP 0871244 A2 10/1998

*Primary Examiner* — Vanessa Girardi
(74) *Attorney, Agent, or Firm* — Christopher S. Clancy; James H. Williams; Aimee E. McVady

(57) ABSTRACT

A grounding pipe clamp secures a pipe and accommodates various attachment configurations to secure a range of conductor sizes. The grounding pipe clamp includes a bolt, a main body, and clamping pads. The bolt has a first leg and a second leg. The main body has a first end portion, a middle portion, and a second end portion. The first end portion has a slot that receives the first leg of the bolt. The second end portion has a L-shaped cutout that receives the second leg of the bolt to secure a pipe between the main body and the bolt. The clamping pads are secured to the first leg of the bolt and the second leg of the bolt. The clamping pads secure the conductors positioned on the main body.

17 Claims, 40 Drawing Sheets

(56) References Cited

U.S. PATENT DOCUMENTS

| | | |
|---|---|---|
| 5,687,938 A | 11/1997 | Bailey |
| 5,888,104 A * | 3/1999 | Mello .................. E04F 15/024 |
| | | 439/785 |
| 5,979,947 A | 11/1999 | Bushouse |
| 6,283,425 B1 | 9/2001 | Liljevik |
| 7,586,036 B2 | 9/2009 | Davis et al. |
| 7,703,722 B2 | 4/2010 | Bucciferro et al. |
| 7,708,234 B2 | 5/2010 | Kossak |
| 7,803,001 B2 | 9/2010 | Wason |
| 8,021,169 B1 | 9/2011 | Smith |
| 8,192,210 B2 | 6/2012 | Gardner et al. |
| 8,449,308 B2 | 5/2013 | Smith |
| 8,755,664 B2 | 6/2014 | Balfour |
| 8,864,502 B2 | 10/2014 | Dinh |
| 9,787,004 B2 | 10/2017 | Dinh et al. |
| 10,033,120 B2 | 7/2018 | Herron |
| 10,109,932 B2 * | 10/2018 | Trombley ................ H01R 4/46 |
| 10,230,181 B2 | 3/2019 | Krueger et al. |
| 2016/0034411 A1 | 2/2016 | Smith et al. |
| 2019/0008600 A1 | 1/2019 | Pedros et al. |
| 2019/0012103 A1 | 1/2019 | Masson |

* cited by examiner

GROUNDING PIPE CLAMP

CROSS REFERENCE TO RELATED APPLICATION

This application claims benefit to U.S. Provisional Patent Application No. 62/887,241, filed on Aug. 15, 2019, the entirety of which is hereby incorporated by reference herein.

FIELD OF THE INVENTION

The present invention relates to grounding pipe clamps, and more particularly to a grounding pipe clamp with multiple conductor port configurations for accommodating a wide size range.

BACKGROUND OF THE INVENTION

Typical pipe clamps are designed to only accommodate one configuration for a relatively narrow size range of conductors. Pipe clamps are generally designed for specific diameters of pipes. Pipe clamps are also designed to accommodate either conductor(s) attached parallel to a pipe or a conductor(s) attached perpendicular to a pipe. Since the typical pipe clamps have been designed for a relatively narrow size range and configuration, a variety of pipe clamps need to be available for the end user.

As a result, there is a need for a versatile universal pipe clamp that is designed to accommodate a variety of attachment configurations for a wider range of conductor sizes.

SUMMARY OF THE INVENTION

The present invention is directed to a grounding pipe clamp that secures a pipe and accommodates various attachment configurations for a range of conductor sizes. The grounding pipe clamp includes a bolt, a main body, and clamping pads. The bolt has a first leg and a second leg. The main body has a first end portion, a middle portion, and a second end portion. The first end portion has a slot. The slot receives the first leg of the bolt. The second end portion has a L-shaped cutout. The L-shaped cutout receives the second leg of the bolt to secure the pipe between the main body and the bolt. The clamping pads are secured to the first leg of the bolt and the second leg of the bolt. The clamping pads secure the conductors positioned on the main body.

DETAILED DESCRIPTION

The present invention is directed to a pipe clamp that accommodates a wide range of conductor sizes. The pipe clamp is designed for grounding pipes, tubes, rods, round bars, and rebars. The first embodiment of the pipe clamp provides an easy installation because both attaching the connector to a member to be grounded and securing the grounding conductor to the connector may be performed without separating any of the clamp components.

FIGS. 1-20 illustrate a first embodiment of a grounding pipe clamp 100.

Figure 1:
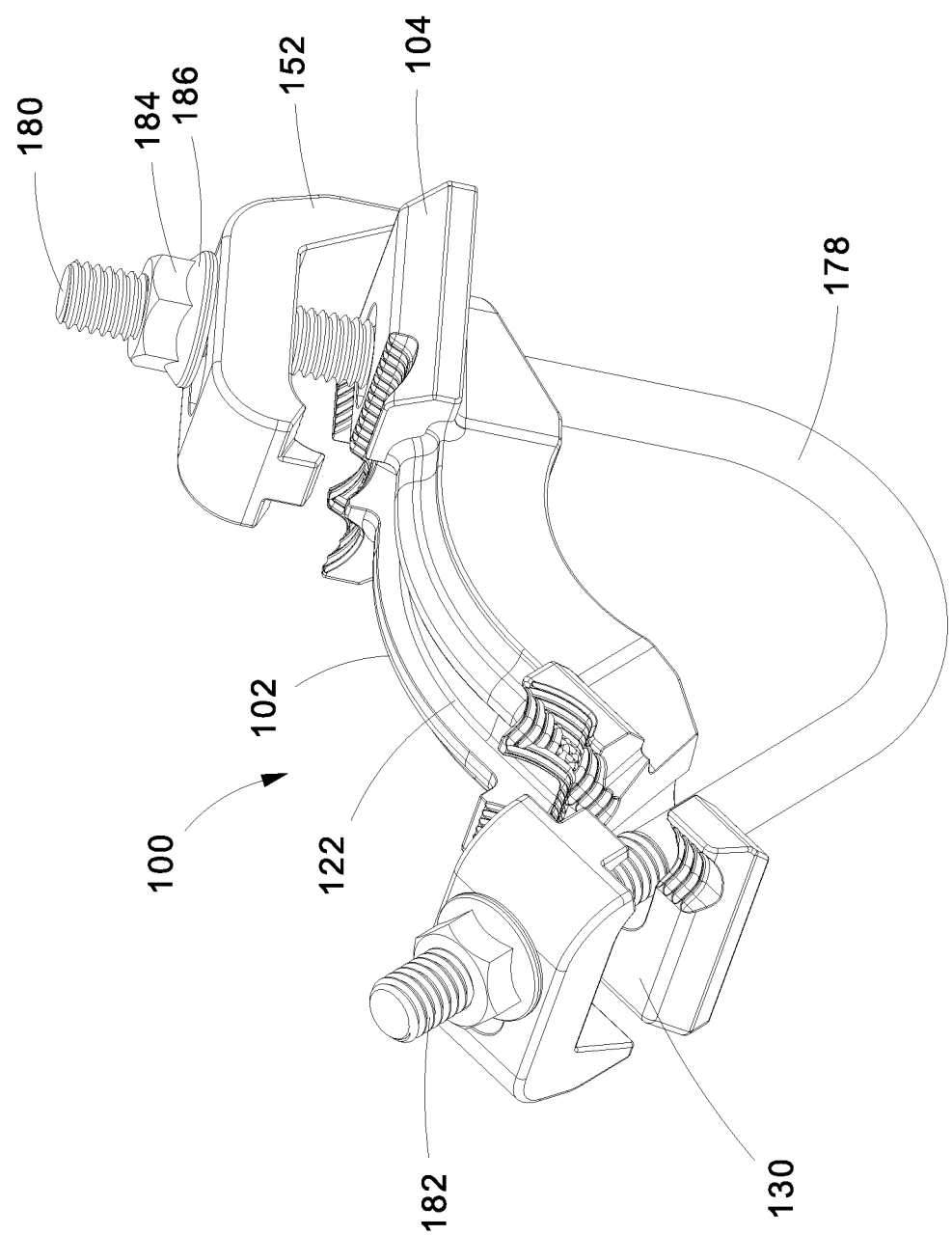
FIG. 1 is a perspective view of the grounding pipe clamp of the present invention.
Figure 2:
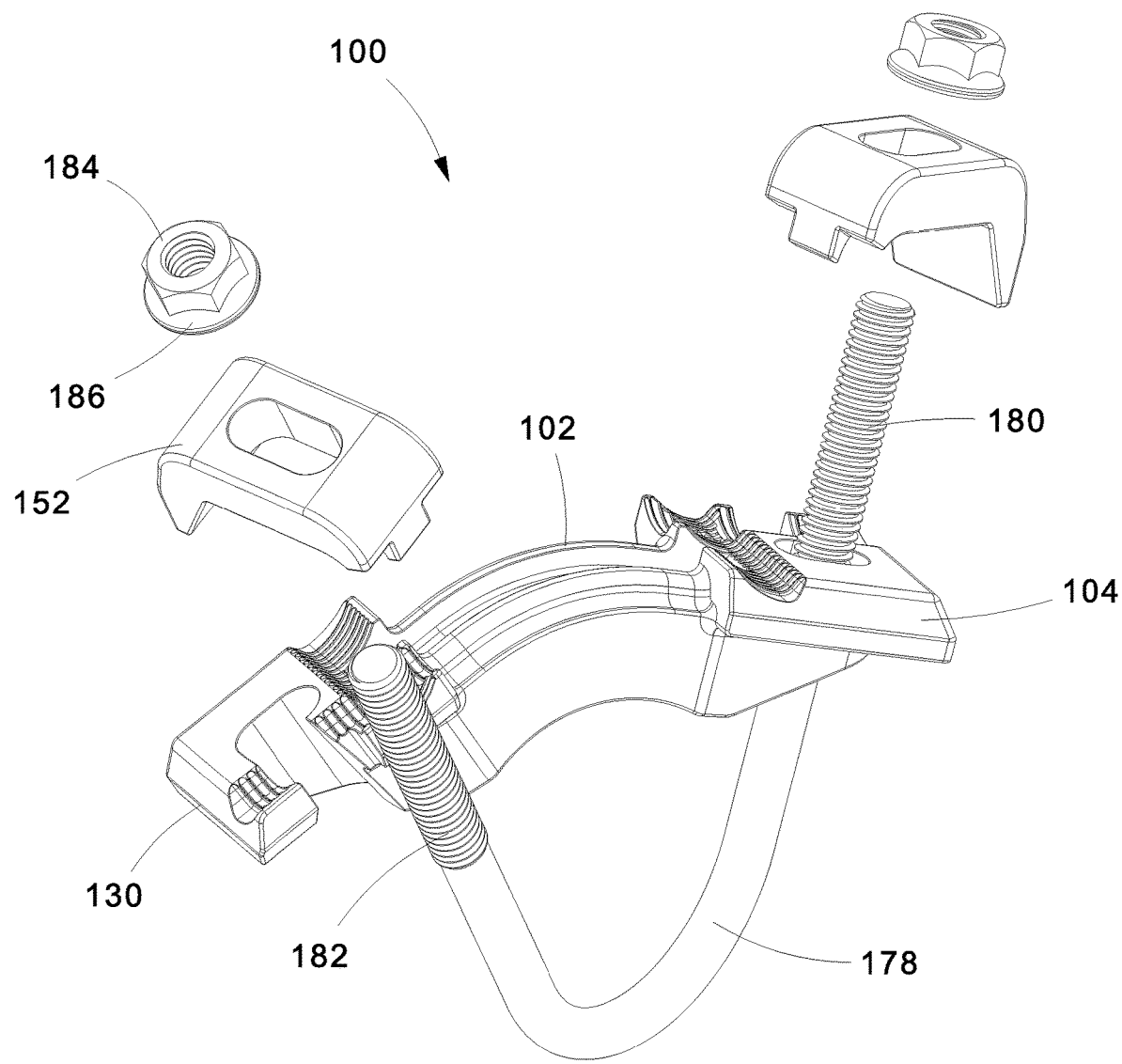
FIG. 2 is a perspective exploded view of the grounding pipe clamp of FIG. 1 with the V-bolt rotated to a partially open position.

As illustrated in FIGS. 1 and 2, the grounding pipe clamp 100 includes a main body 102, two clamping pads 152, mounting v-bolt 178, and two serrated hex nuts 184. As discussed below, each clamping pad 152 may be positioned in either of two positions rotated by a 90-degree angle with respect to each other. This configuration allows the grounding conductors 70 to be attached in configurations that are either parallel or perpendicular to the pipe 50 to be grounded. Alternatively, one perpendicular conductor 70 and one parallel conductor 70 may also be attached.

As illustrated in FIG. 2, the hex nuts 184 may include a flange 186. Alternatively, hex nuts without flanges may be used either alone or in conjunction with flat washers or lock washers.

Figure 3:
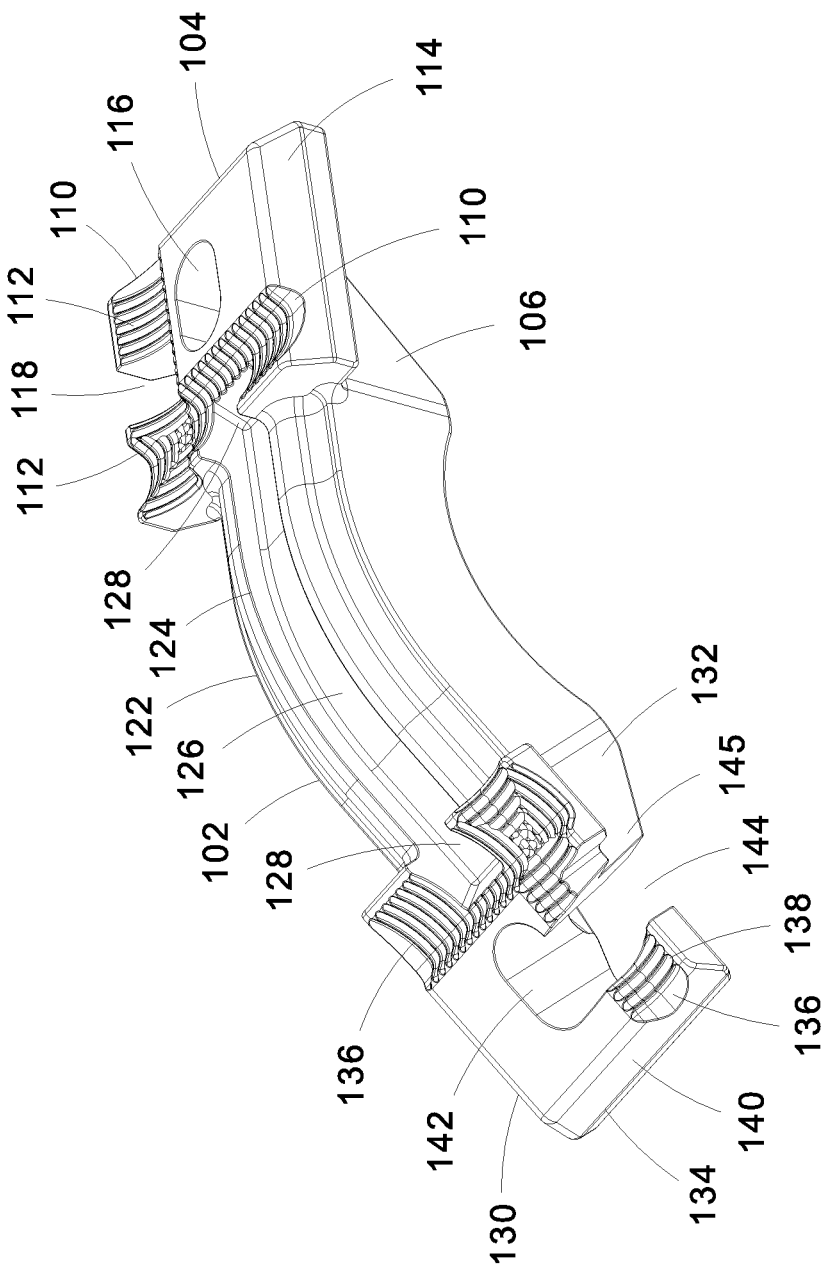
FIG. 3 is a top perspective view of the main body of the grounding pipe clamp of FIG. 1.
Figure 4:
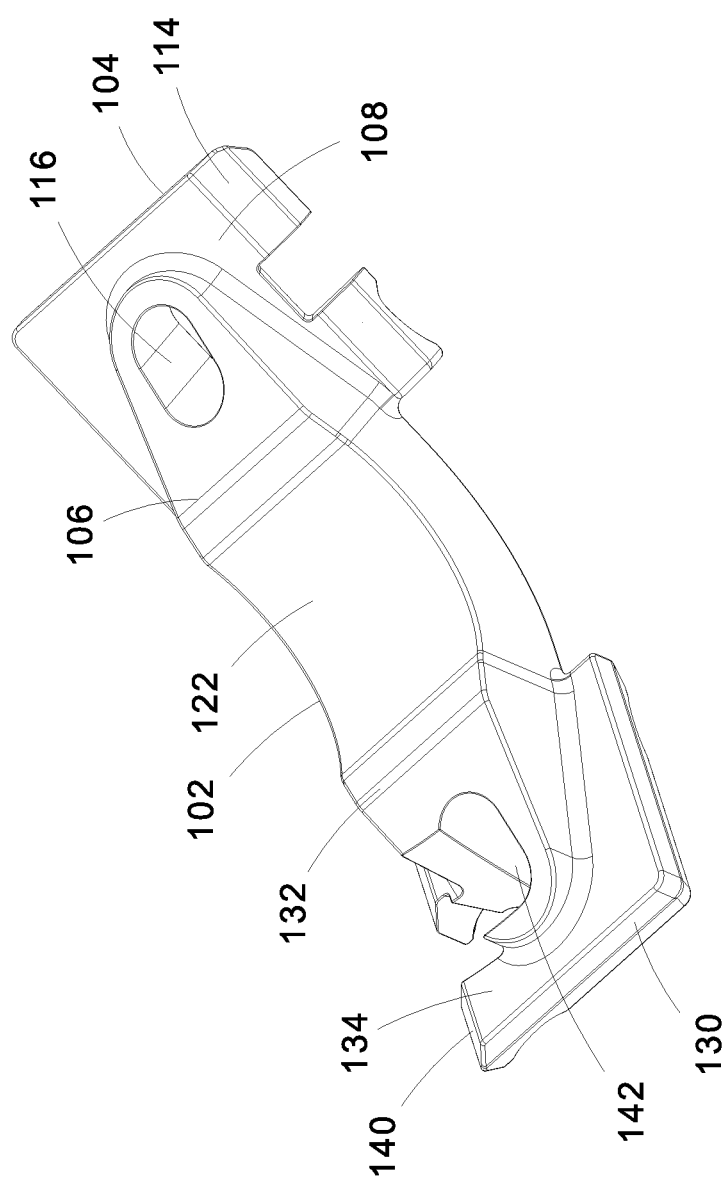
FIG. 4 is a bottom perspective view of the main body of the grounding pipe clamp of FIG. 3.

FIGS. 3 and 4 illustrate the main body 102 of the grounding pipe clamp 100. The main body 102 includes a first end portion 104, a curved middle portion 122, and a second end portion 130. The middle portion 122 has two reinforcing ribs 124 that form a slot 126 in the middle portion 122. The ends 128 of the slot 126 receive and locate the tips 164 or ends of the clamping pads 152.

The first and second end portions 104, 130, respectively, of the main body 102 include supporting members 106, 132 (see FIG. 4) and base pads 108, 134, respectively. The first end portion 104 has an oblong shaped slot 116 positioned in the middle area and a side cutout 118. The slot receives a first leg 180 of the V-bolt 178. The second end portion 130 has a generally L-shaped cutout 142 with a portion of the cutout extending out to the side 145 of the second end portion 130. The L-shaped cutout 142 creates an entry 144 for receiving a second leg 182 of the V-bolt 178.

The base pad 108, 134 of the first and second end portions 104, 130, respectively, has two shallow asymmetric grooves 110, 136. The grooves 110, 136 are positioned at a right angles with respect to each other. The grooves 110, 136 serve as wire ports. Each groove 110, 136 has a pattern of fine ribs 112, 138, respectively. The base pads 108, 134 also include two angular bearing surfaces 114, 140, respectively, positioned on a side opposite the grooves 110, 136 or wire ports.

As illustrated in FIG. 4, the bottom of main body includes supporting members 106, 132 at the first and second ends 104, 130.

Figure 5:
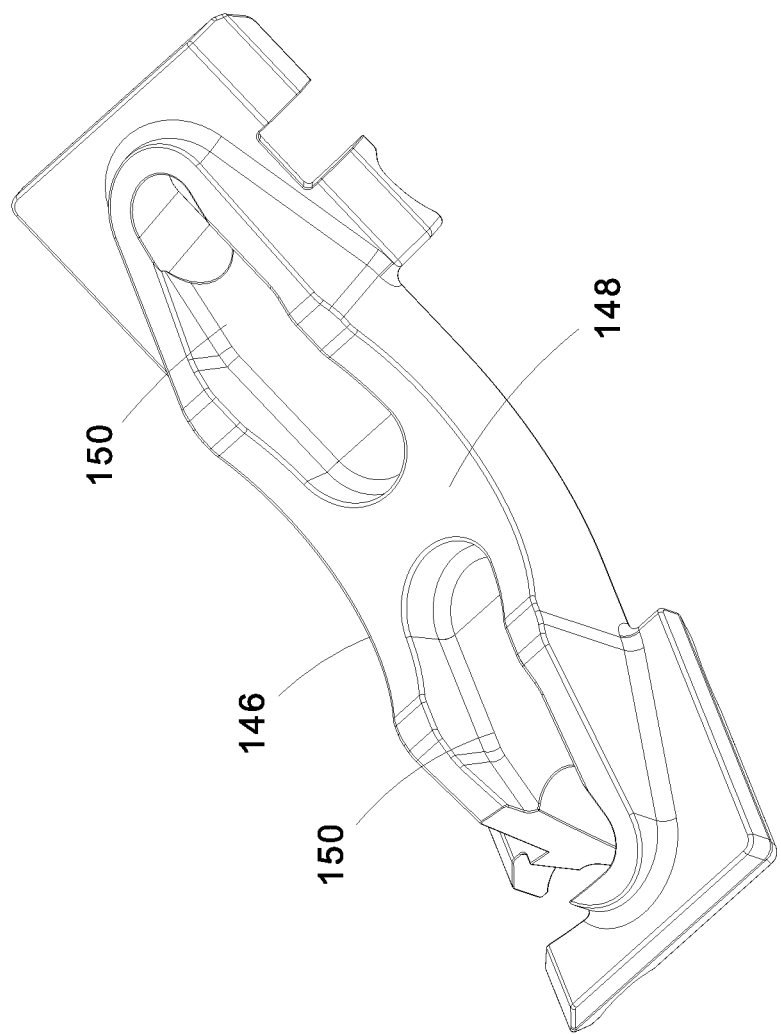
FIG. 5 is a bottom perspective view of an alternative design of the main body of FIG. 3.

FIG. 5 illustrates an alternative main body 146 for the grounding pipe clamp. The bottom 148 may have a cored-out area 150 to decrease the amount of material used to manufacture the main body 146. The cored-out main body still maintains the strength as the main body illustrated in FIG. 4.

Figure 6B:
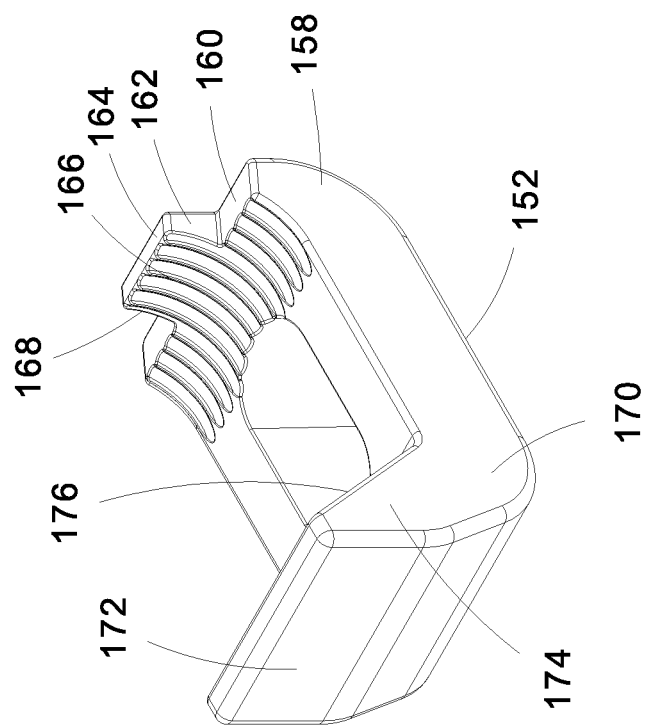
FIG. 6B is a bottom perspective view of the clamping pad of FIG. 6A.
Figure 6A:
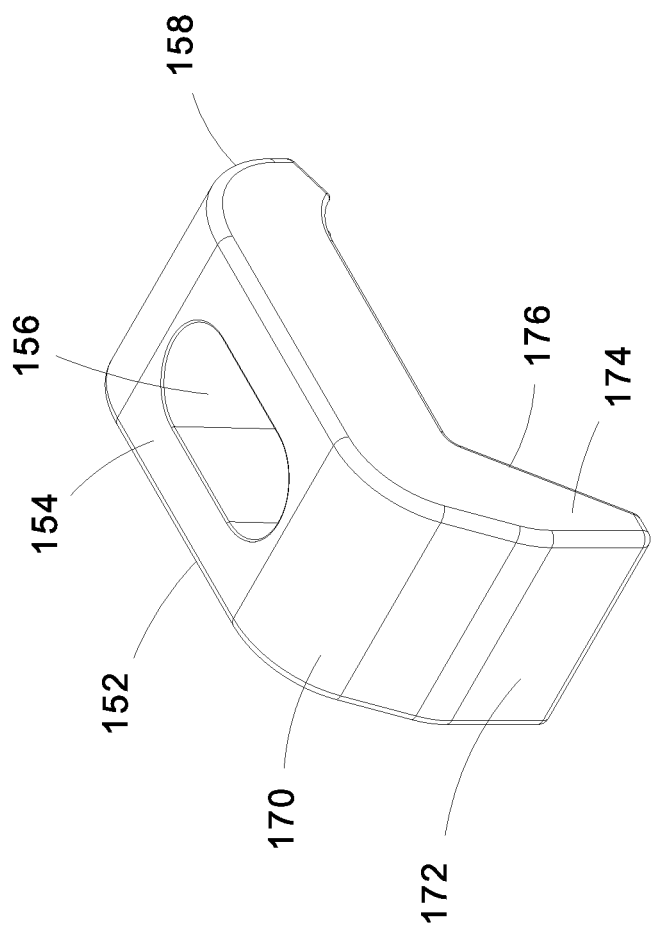
FIG. 6A is a top perspective view of the clamping pad of the grounding pipe clamp of FIG. 1.

FIGS. 6A and 6B illustrate the clamping pad 152 of the grounding pipe clamp 100 of the present invention. The clamping pad 152 comprises a middle portion 154, a first end 158, and a second end 170. The middle portion 154 includes an oblong shaped slot 156. The first end 158 is curved with corner reliefs 160 defining a short flange 162 with a tip 164. The inner side 166 of the first end 158 has a pattern of fine ribs 168. The second end 170 includes a longer flange 172 with an angular end 174 with an inner bearing surface 176.

Both the main body 102 and the clamping pads 152 include slots 142, 156, respectively, that enable the main body 102 and clamping pads 152 to pivot and rotate about the first leg 180 of the V-bolt 178 to facilitate the installation of the one or more conductors 70 on the pipe 50 that is to be grounded.

As illustrated in FIG. 2, the first leg 180 of the V-bolt 178 is positioned through the slot 116 at the first end 104 of the main body 102. The second leg 182 of the V-bolt 178 is opened or swings away from the second end 130 of the main body 102. The clamping pads 152 are installed on the V-bolt legs 180, 182 and the flanged hex nuts 184 are positioned at the end of the V-bolt legs 180, 182 to maintain the clamping pads 152. The grounding pipe clamp 100 is positioned on a pipe 50 such that the V-bolt 178 wraps arounds a portion of the pipe's circumference. The V-bolt 178 is held against the pipe 50 and the main body 102 is rotated until the open L-shaped cutout 142 in the main body 102 engages the second leg 182 of the V-bolt 178. After the V-bolt leg 182 is trapped in the main body L-shaped cutout 142, both the V-bolt 178 and the main body 102 are held against the pipe 50. Next the grounding conductors 70 may be inserted and positioned within one of the grooves 110, 136 at the ends 104, 130 of the main body 102. The clamping pads 152 are then lowered onto the grounding conductors. The hex nuts 184 are twisted until the grounding conductors 70 are fully secured in place by the clamping pads 152.

Figure 7:
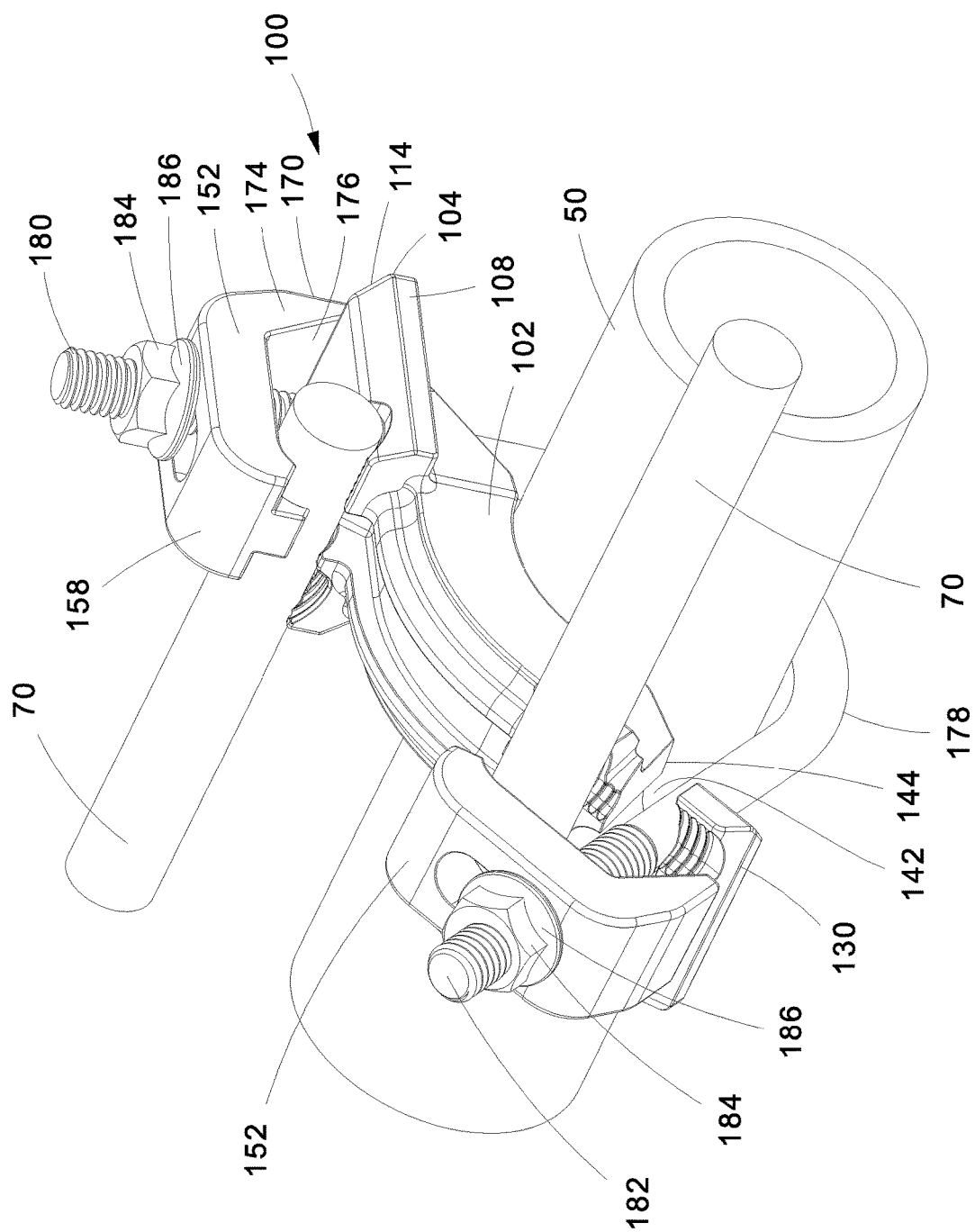
FIG. 7 is a perspective view of the grounding pipe clamp of FIG. 1 connecting two grounding conductors parallel to a pipe.
Figure 8:
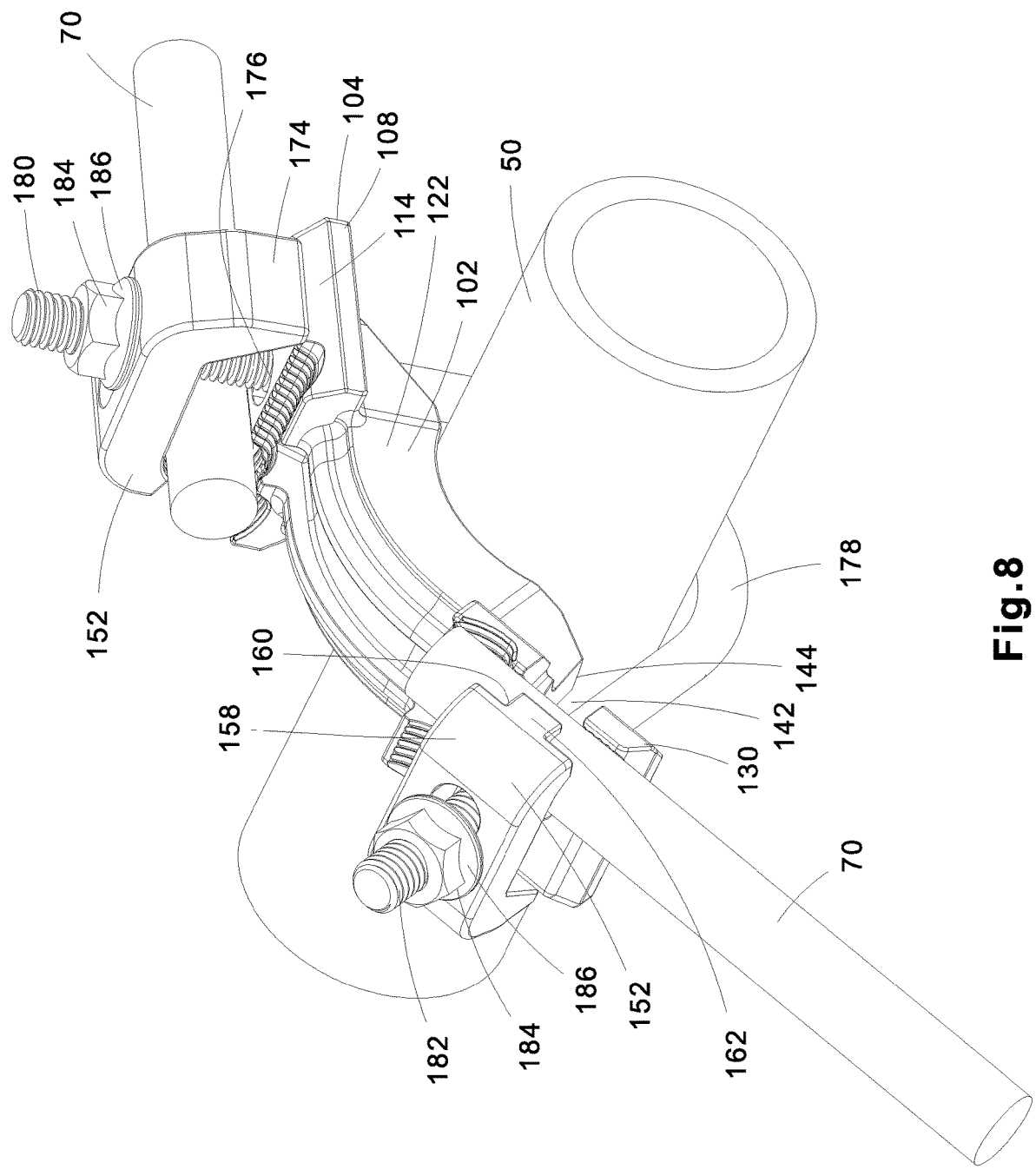
FIG. 8 is a perspective view of the grounding pipe clamp of FIG. 1 connecting two grounding conductors perpendicular to a pipe.
Figure 9:
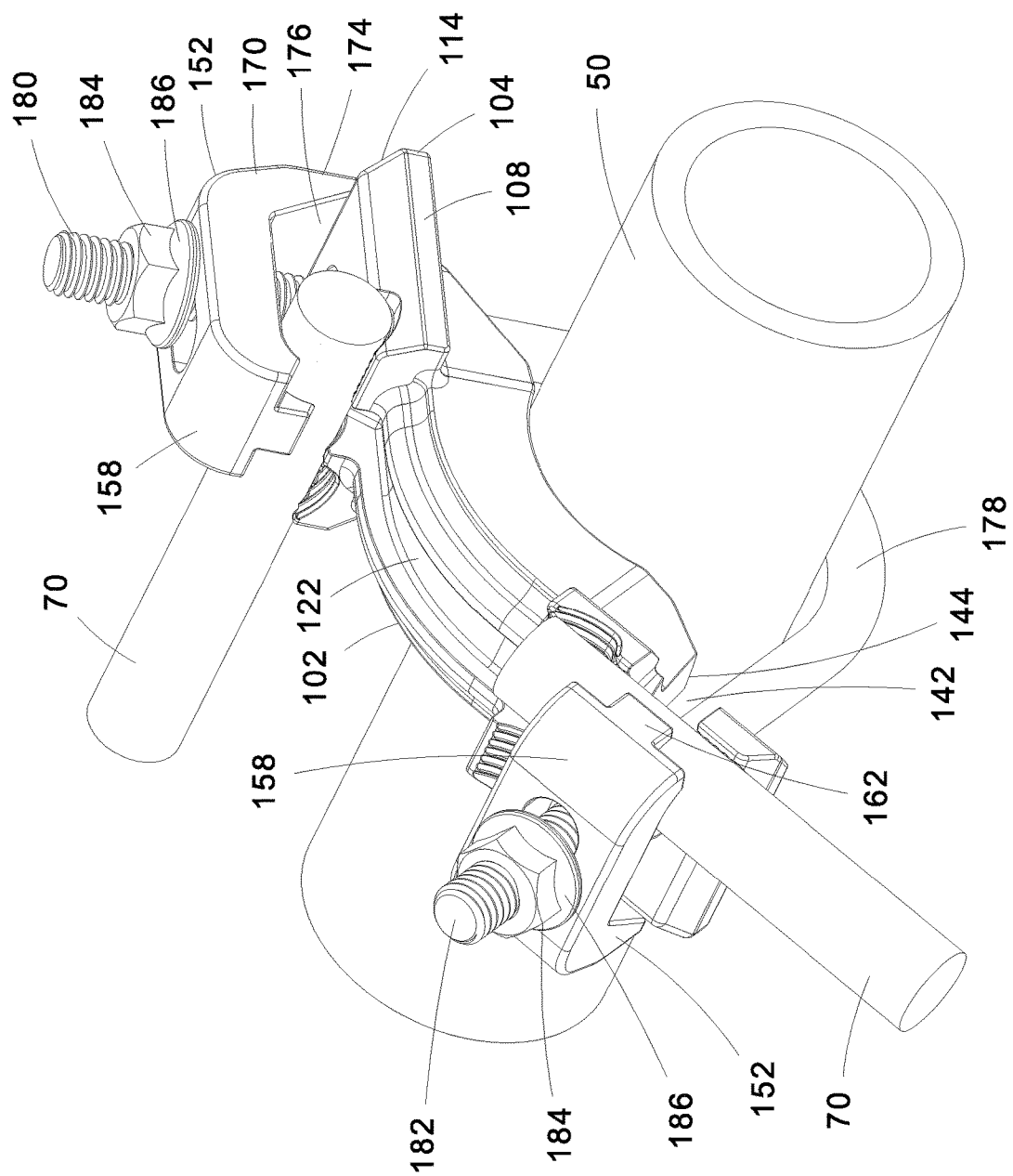
FIG. 9 is a perspective view of the grounding pipe clamp of FIG. 1 connecting two grounding conductors and a pipe with one conductor parallel to the pipe and one conductor perpendicular to the pipe.
Figure 10:
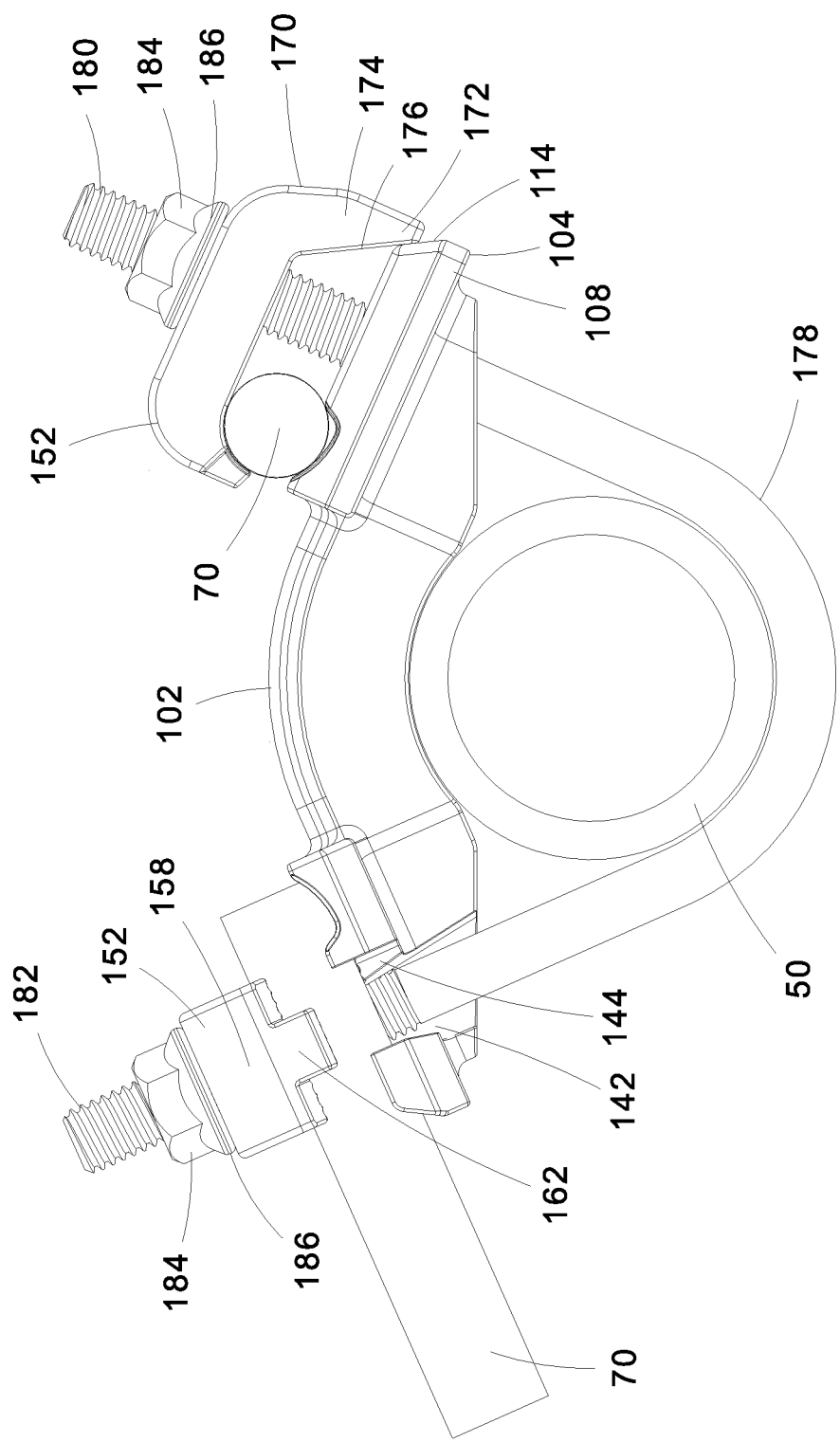
FIG. 10 is a side view of the grounding pipe clamp, grounding conductors, and pipe of FIG. 9.

FIGS. 7-10 illustrate three different configurations of grounding conductors 70 connected to the pipe 50 by the grounding pipe clamp 100 of the present invention. FIG. 7 illustrates the grounding pipe clamp 100 securing a pipe 50 and two conductors 70 that are parallel to the pipe 50. FIG. 8 illustrates the grounding pipe clamp 100 securing a pipe 50 and two conductors 70 that are perpendicular to the pipe 50. FIGS. 9 and 10 illustrate the grounding pipe clamp 100 securing a pipe 50 and one conductor 70 that is parallel to the pipe 50 and one conductor 70 that is perpendicular to the pipe 50. Thus, the grounding pipe clamp 100 of the present invention provides various conductor attachment configurations. As a result, the grounding pipe clamp of the present invention replaces a number of known existing grounding clamps that are capable of only one configuration, such as a single conductor parallel with the pipe or a single conductor perpendicular to the pipe.

Figure 11:
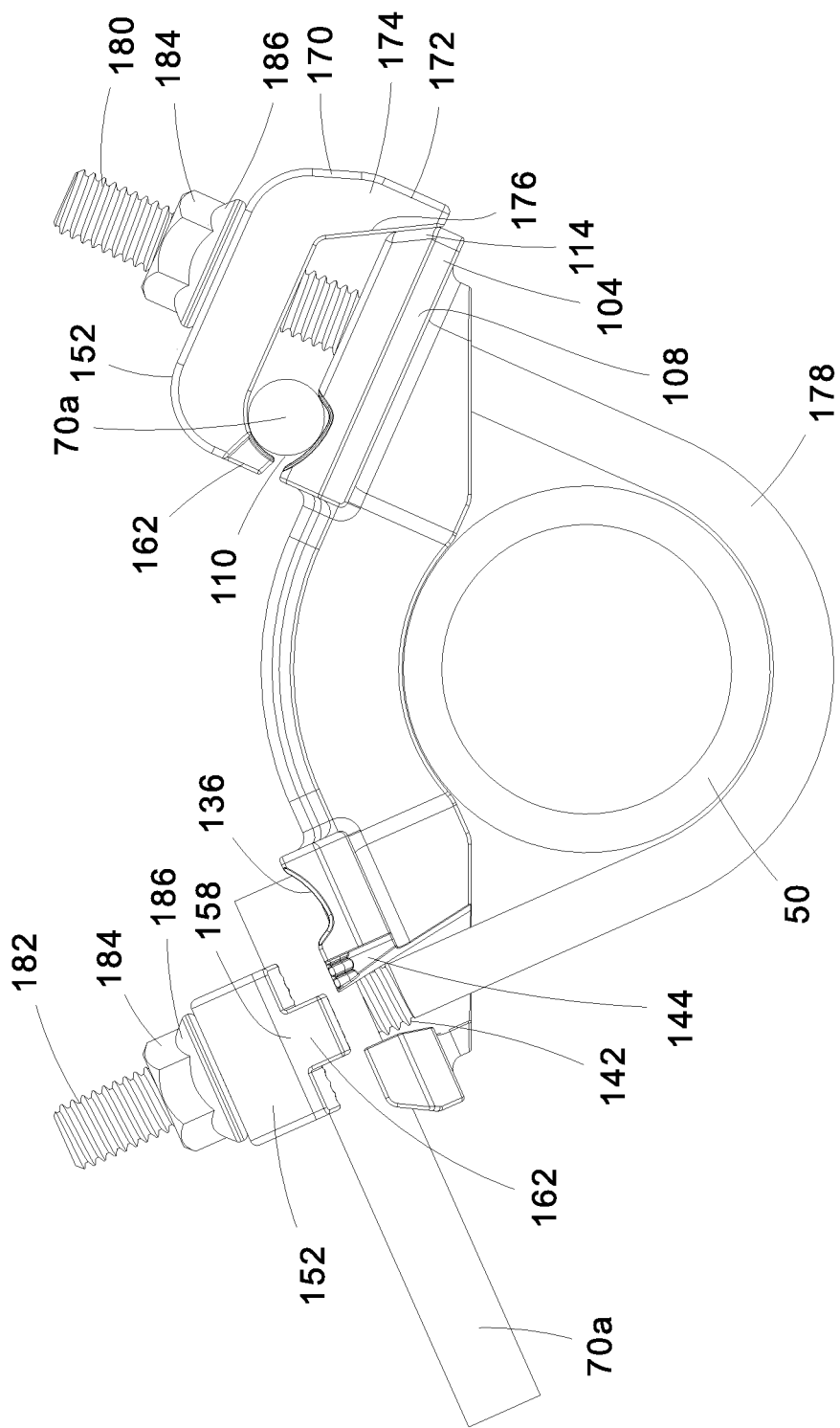
FIG. 11 is a side view of an alternative size of the grounding conductors connected to the grounding pipe clamp and pipe of FIG. 10.
Figure 12:
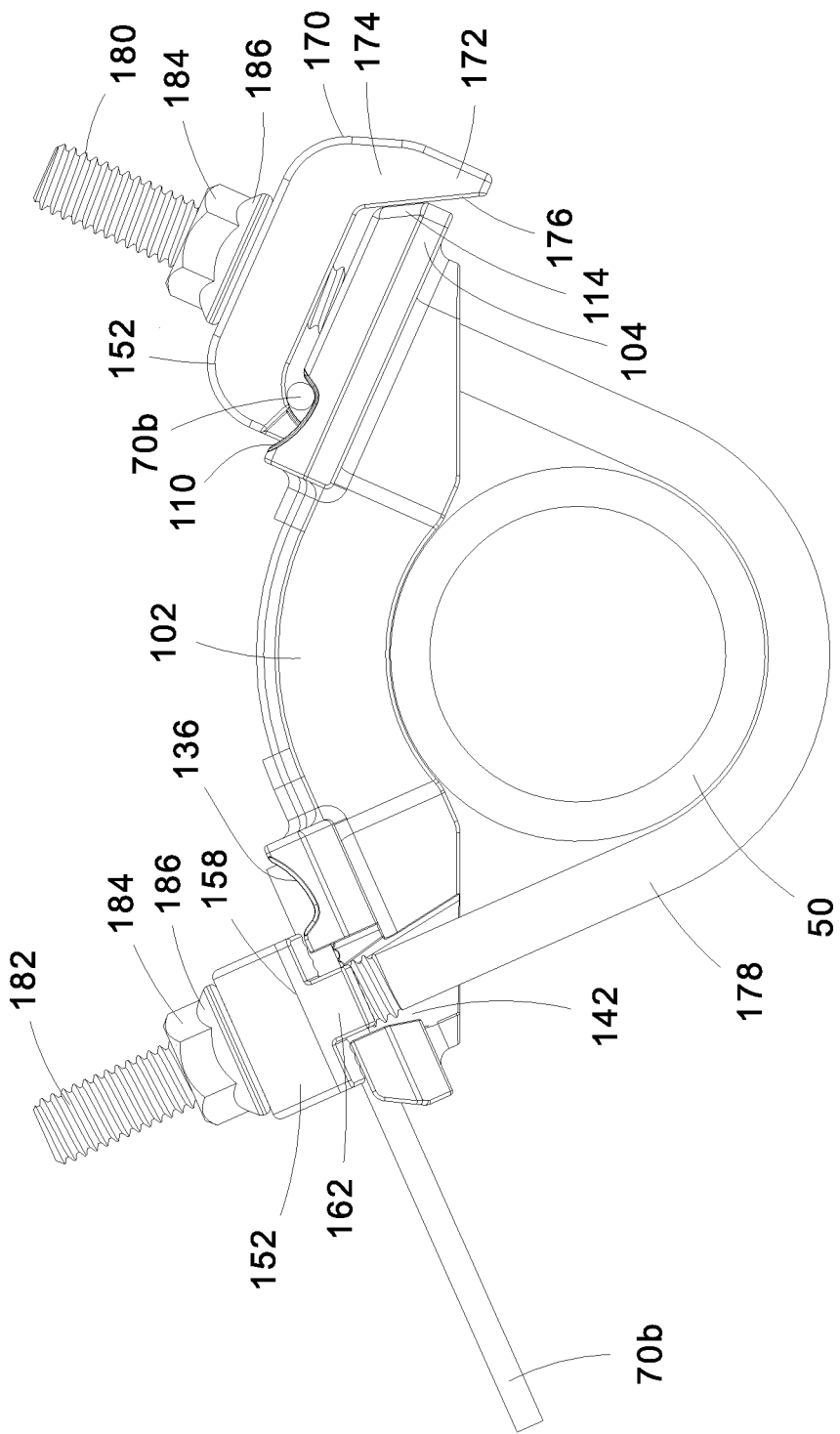
FIG. 12 is a side view of an alternative size of the grounding conductors connected to the grounding pipe clamp and the pipe of FIG. 10.
Figure 13:
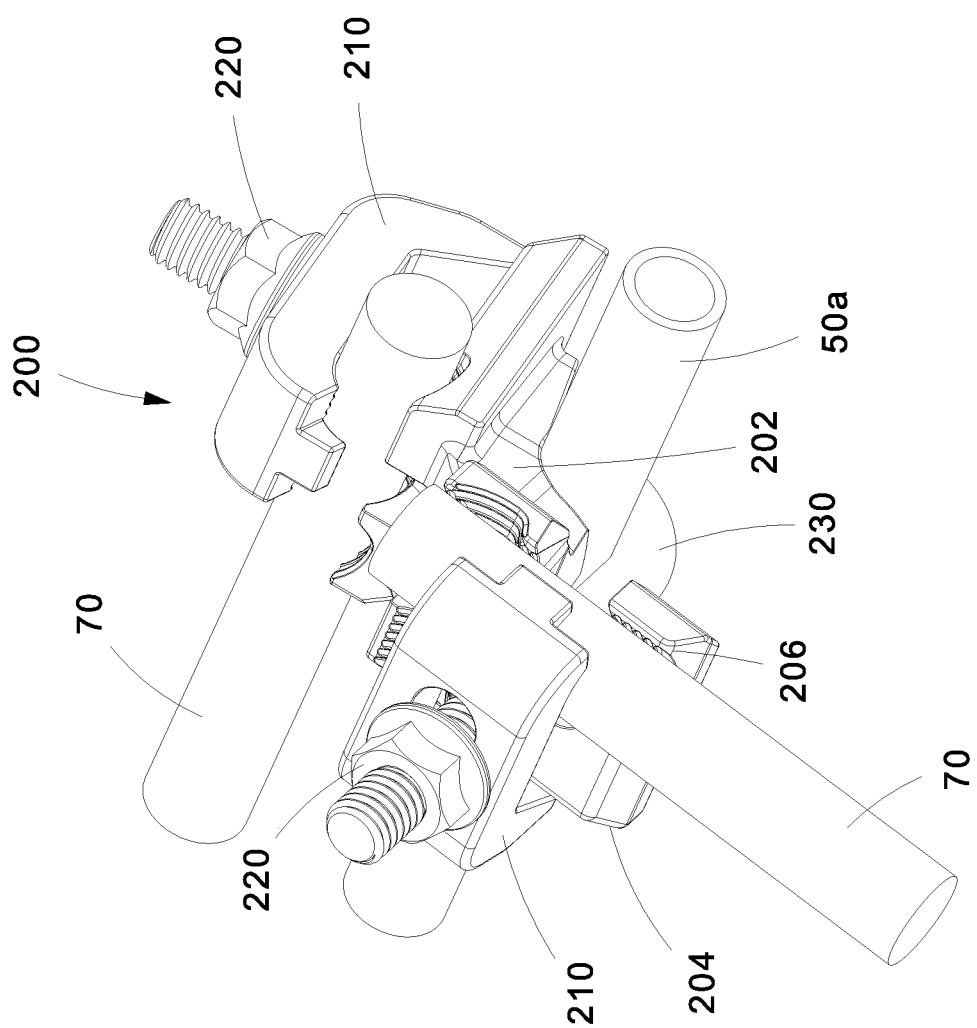
FIG. 13 is an alternative grounding pipe clamp for smaller diameter pipes with grounding conductors connected.
Figure 14:
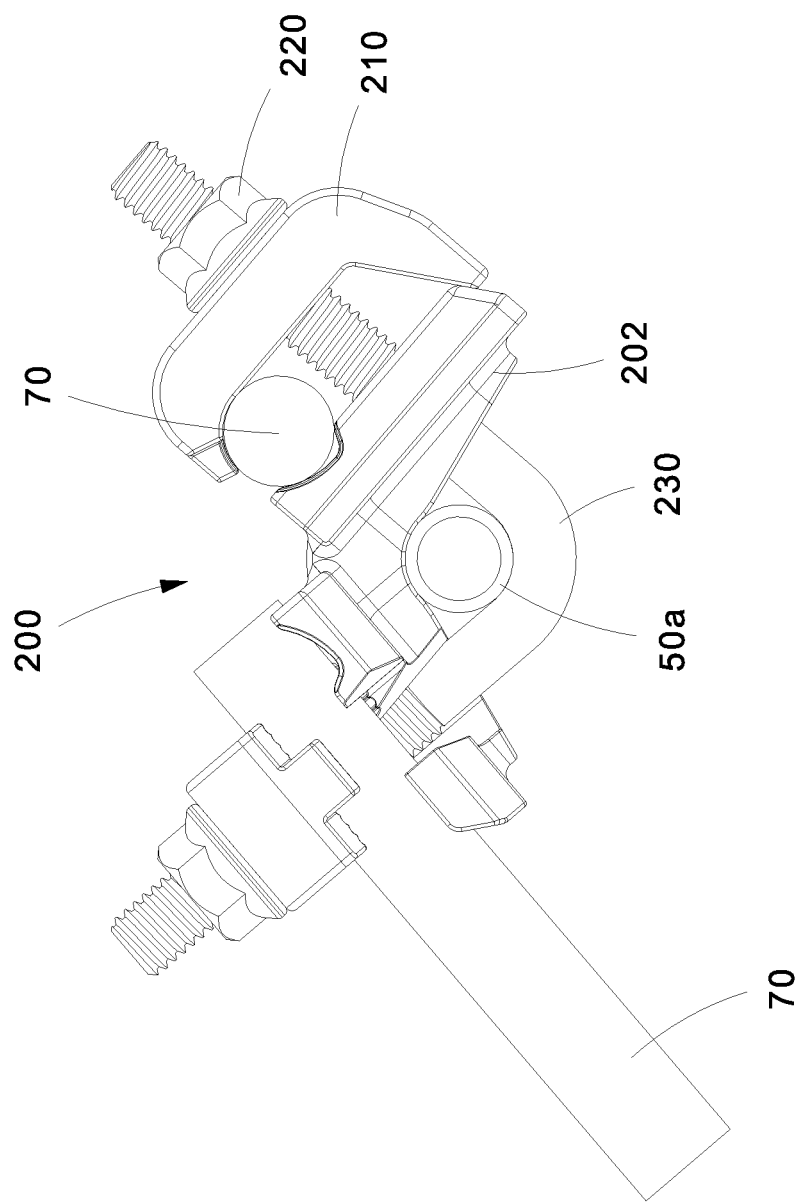
FIG. 14 is a side view of the grounding pipe clamp, pipe, and attached conductors of FIG. 13.
Figure 15:
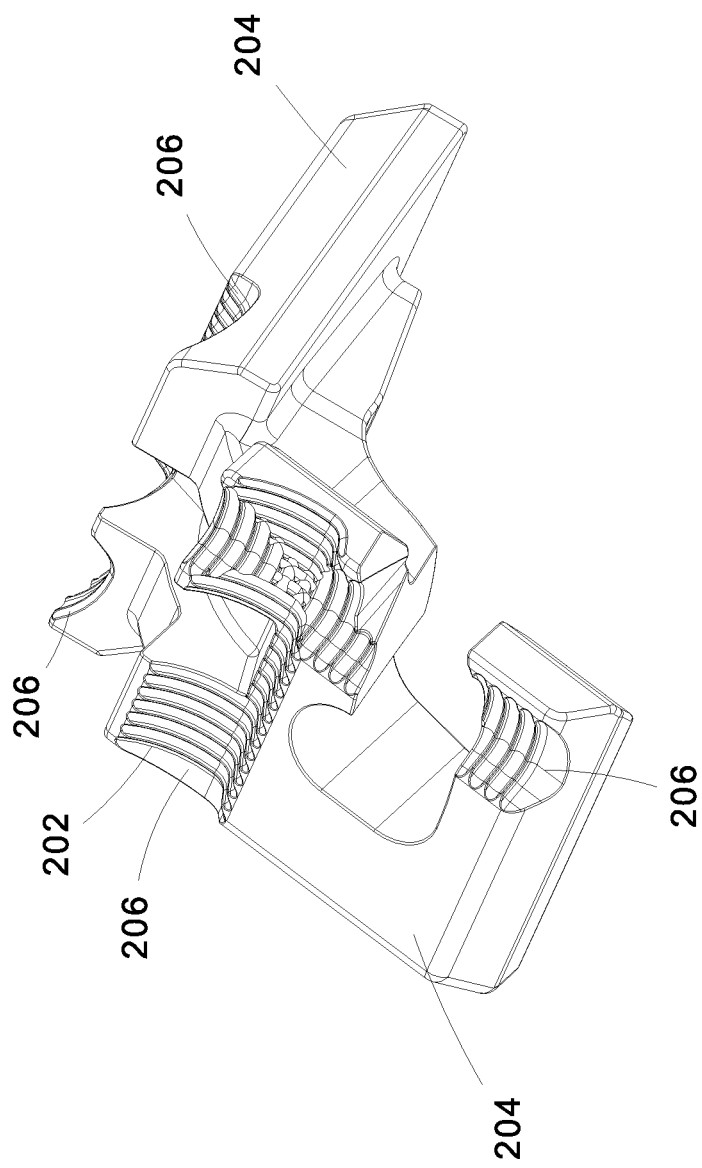
FIG. 15 is a top perspective view of the main body of the grounding pipe clamp of FIG. 13.
Figure 16:
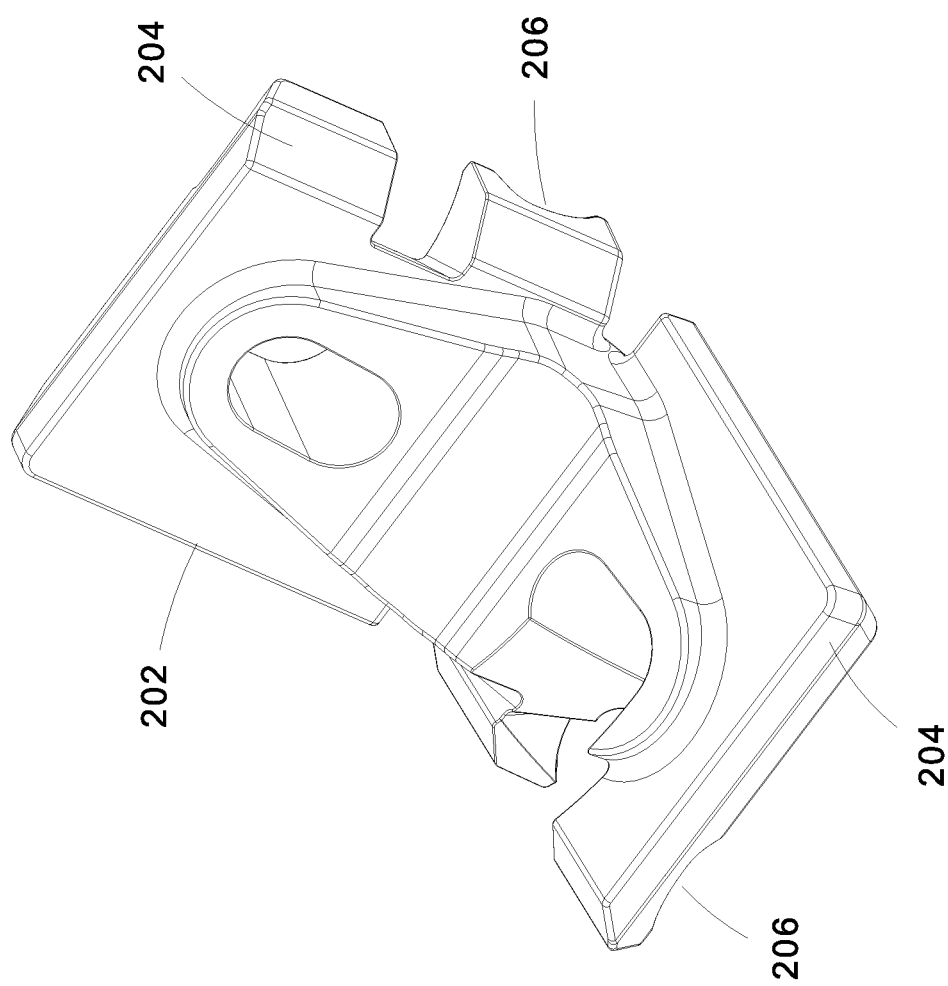
FIG. 16 is a bottom perspective view of the main body of the grounding pipe clamp of FIG. 15.
Figure 17:
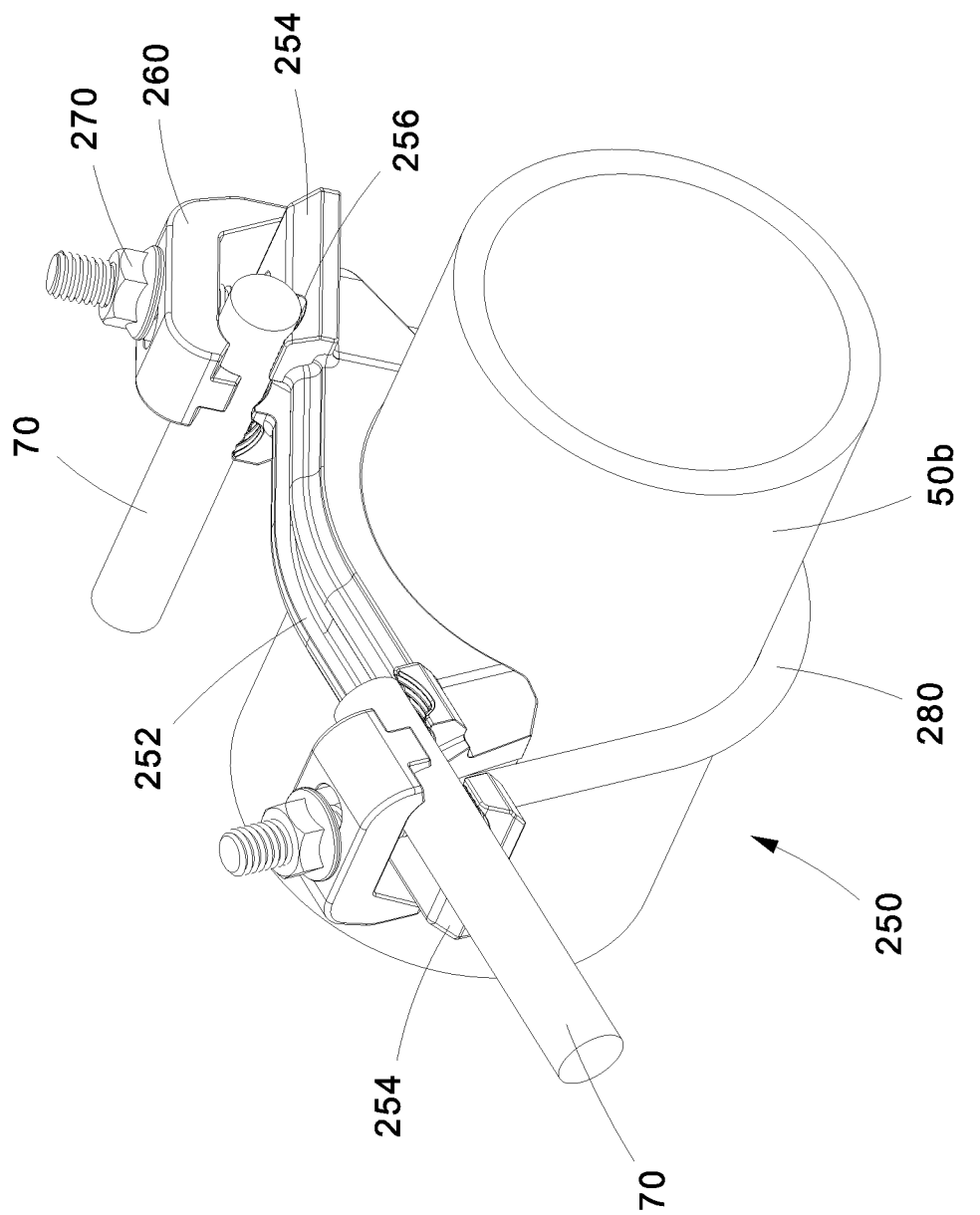
FIG. 17 is an alternative grounding pipe clamp for large diameter pipes with grounding conductors connected.
Figure 18:
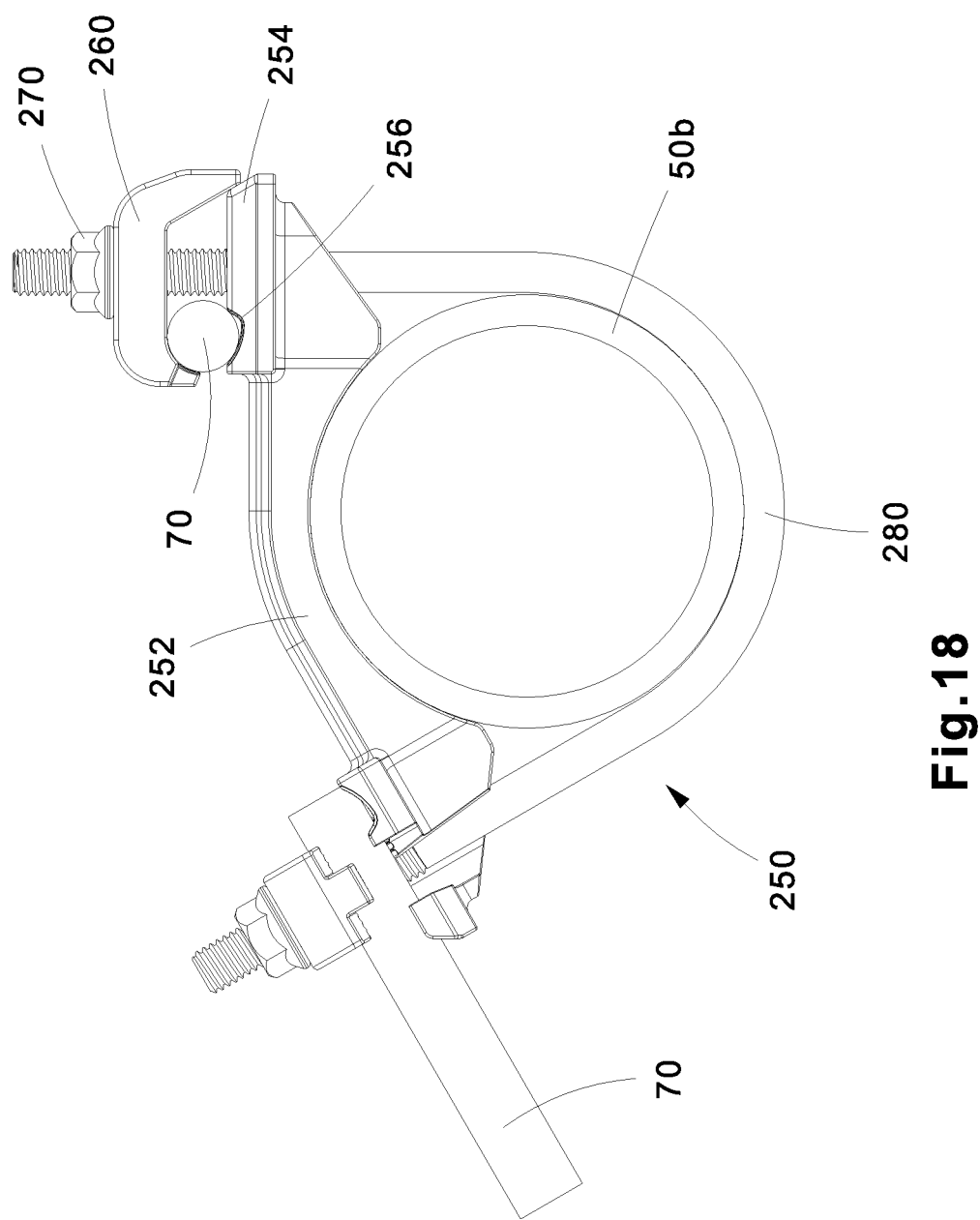
FIG. 18 is a side view of the grounding pipe clamp, pipe, and attached conductors of FIG. 17.
Figure 19:
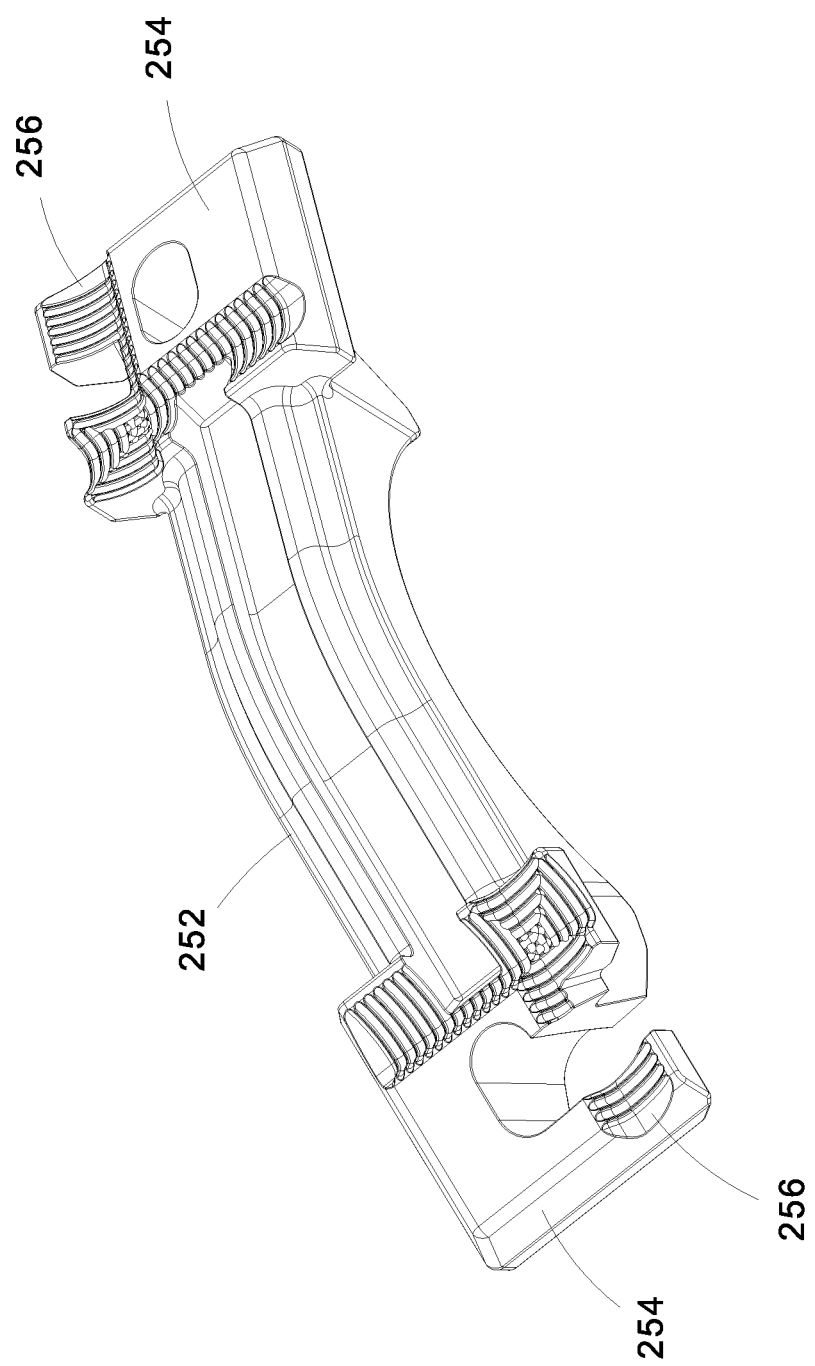
FIG. 19 is a top perspective view of the main body of the grounding pipe clamp of FIG. 17.
Figure 20:
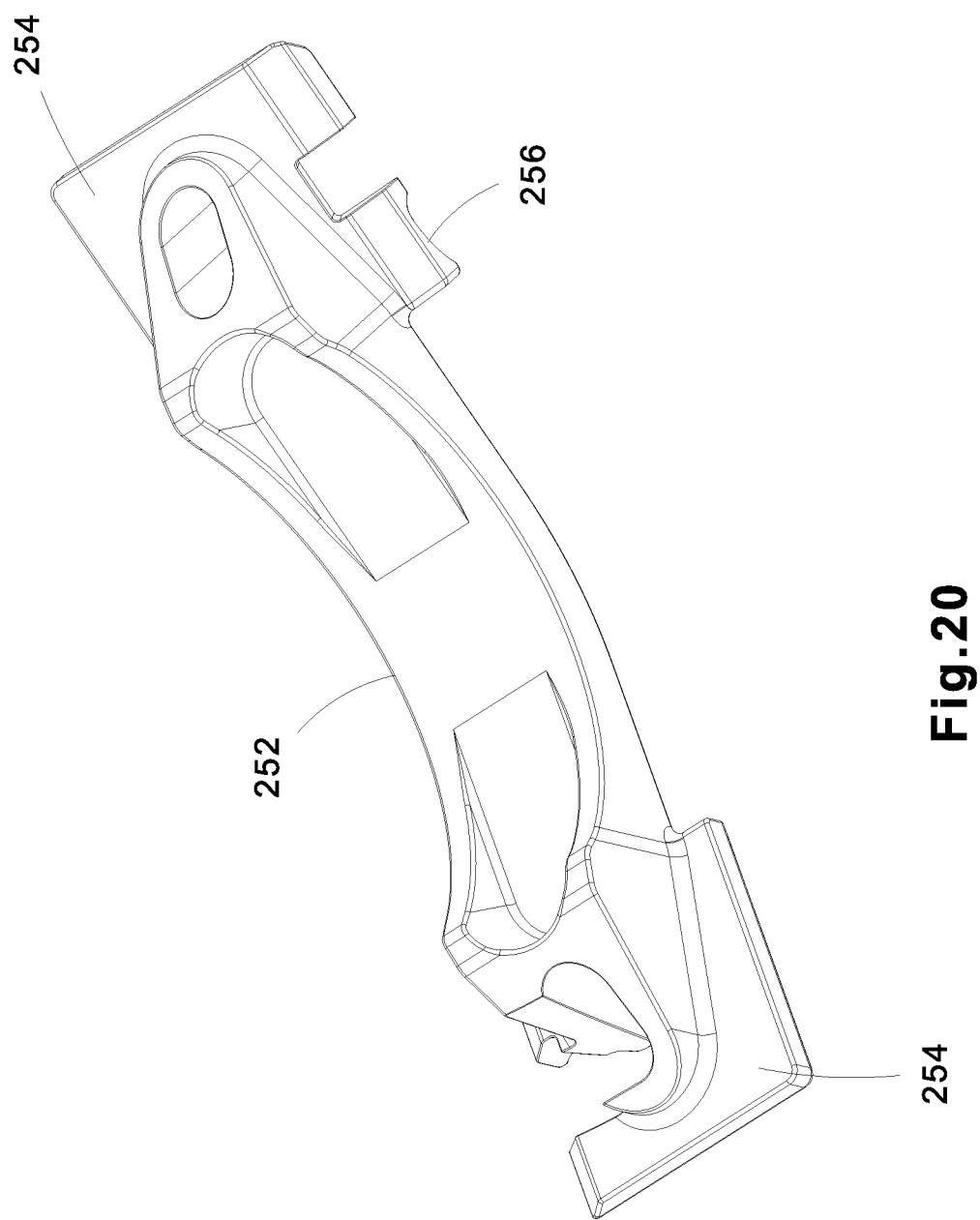
FIG. 20 is a bottom perspective view of the main body of the grounding pipe clamp of FIG. 19.

The grounding clamp of the present invention also provides for the capability of receiving a wide range of conductor sizes. Typically, there are three size ranges for prior art mechanical clamps. The grounding pipe clamp of the present invention can accommodate sizes ranging from 8 AWG-250 kcmil. This is accomplished by using the clamping pads of the present invention. The curved first end 158 of the clamping pad 152 retains the clamping pad 152 against the grounding conductor 70 regardless of the conductor size, while the angular end 174 and inner bearing surface 176 of the second end 170 ride along the angular bearing surface 114 of the main body first end base pad 108. FIG. 11 illustrates the grounding pipe clamp 100 securing conductors 70a that are smaller than the conductors 70 illustrated in FIG. 10. FIG. 12 illustrates the grounding pipe clamp 100 securing conductors 70b that are even smaller than the conductors 70, 70a illustrated in FIGS. 10 and 11.

As discussed above with respect to FIGS. 6 and 6A, the clamping pads 152 includes a middle portion 154, a first end 158 with a short flange 162, and a second end 170 with a longer flange 172. The short flange 162 of the clamping pad 152 pushes the conductor 70 into the rounded corner of the grooves 110, 136 on the base pad 108, 134 of the main body 100. The longer flange 172 of the clamping pad 152 slides along the angled surface 114, 140 on the base pad 108, 134 of the main body 102. The central horizontal portion of the clamping pad 152 presses downward on the conductor 70. As the conductor 70 partially flattens or takes a slightly oval shape under the pressure, it presses against the clamping pad 152 shorter flange 162 trying to move it toward the center of the main body 102. Thus, the clamping pad 152 longer flange 172 always rests against the angled surface 114, 140 of the base pads 108, 134 of the main body 102, forcing the clamping pad 152 to stay in a position parallel with the base pad. In the case of using a minimum size conductor 70b, the middle portion of the clamping pad may eventually rest on the top surface of the main body base pad 108, 134 when the clamping has been completed.

The clamping pads of the present invention are unlike prior art clamping pads where the clamping pads either rock on supporting ridges or pivot in locating grooves. Thus, the clamping arrangement of the present invention accommodates a wide range of conductor sizes or wire gauges that may be secured to the grounding pipe clamp.

FIGS. 13-16 illustrate an alternative grounding pipe clamp 200 designed to be used with pipes 50a having a small diameter. The grounding pipe clamp 200 includes a main body 202, clamping pads 210, hex nuts 220, and a V-bolt 230. The main body 202 of the grounding pipe clamp includes ends 204 with grooves 206 formed to receive the grounding conductors. The middle portion of the main body 202 has been reduced to accommodate the smaller diameter pipe 50a. The clamping pads 210 secure the conductors to the grounding pipe clamp 200.

FIGS. 17-20 illustrate an alternative grounding pipe clamp 250 designed to be used with pipes 50b having a large diameter. The grounding pipe clamp 250 includes a main body 252, clamping pads 260, hex nuts 270, and a V-bolt 280. The main body 252 of the grounding pipe clamp 250 includes ends 254 with grooves 256 formed to receive the conductors. The middle portion of the main body 252 has been increased to accommodate the large diameter pipe 50b. The clamping pads 260 secure the conductors to the grounding pipe clamp 250.

The shape of the clamp main bodies and the angle of V-bolt vary depending on the size of the pipe that the particular clamp is designed for. The smaller the pipe size, the wider the angle is needed to enable installing the clamp without separating the components of the clamp.

Figure 21:
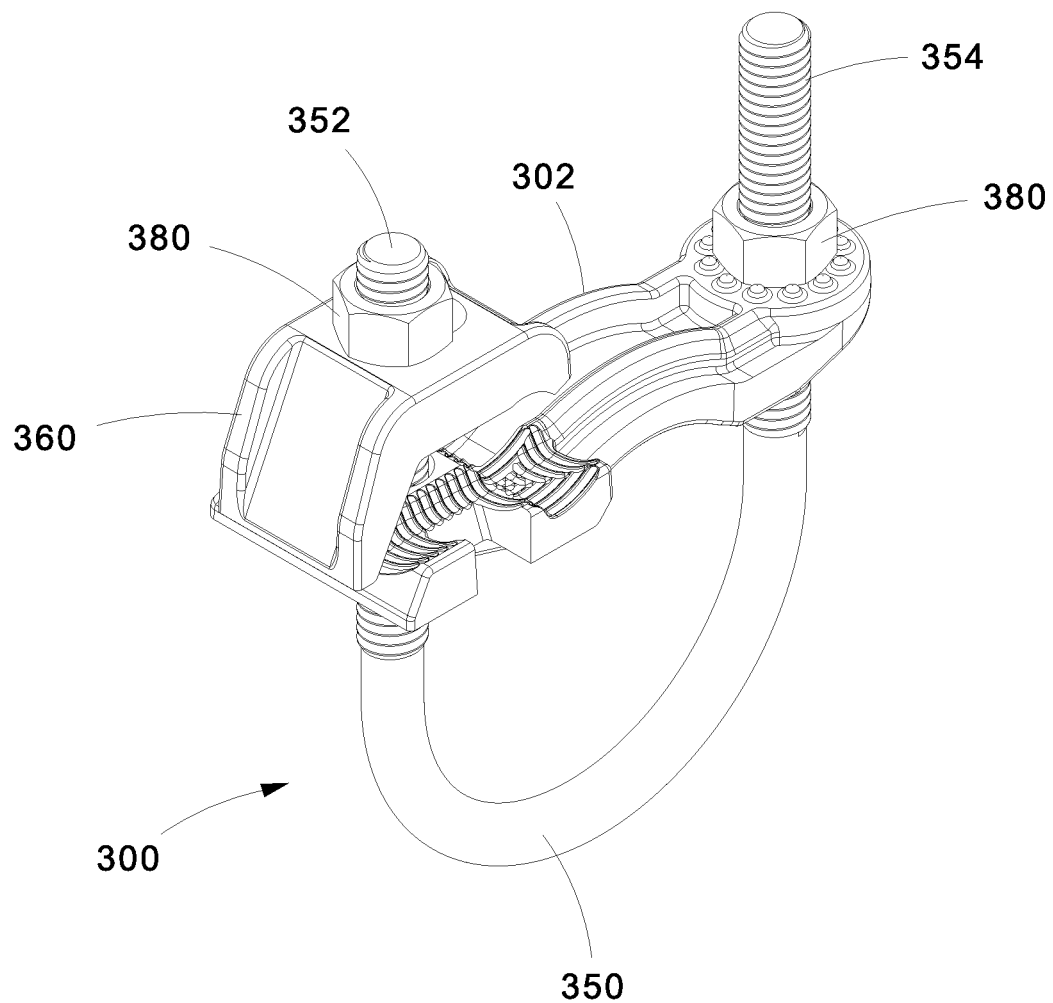
FIG. 21 is a perspective view of an alternative embodiment for a grounding pipe clamp.
Figure 22:
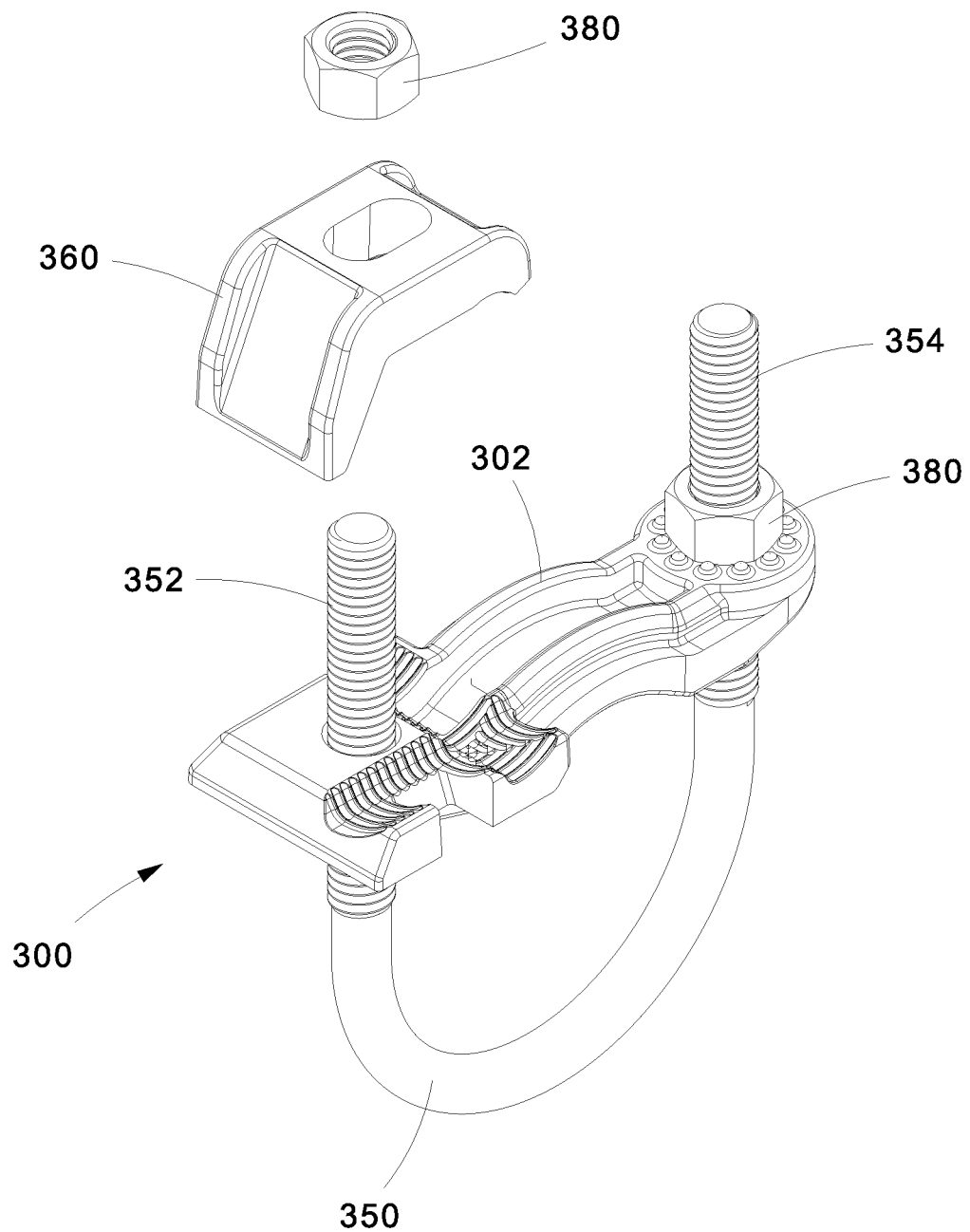
FIG. 22 is a perspective exploded view of the grounding pipe clamp of FIG. 21.

FIGS. 21-40 illustrate a second embodiment of a grounding pipe clamp 300. The grounding pipe clamp 300 also accommodates a range of conductor sizes. The grounding pipe clamp is designed for grounding pipes, tubes, rods, or round bars. As illustrated in FIGS. 21-22, the grounding pipe clamp 300 includes a main body 302, a mounting U-bolt 350, a clamping pad 360, and two hex nuts 380. The clamping pad 360 may be positioned in either of two possible positions rotated by a 90-degree angle with respect to each other. This arrangement allows a grounding conductor to be attached in either a parallel or perpendicular configuration with respect to the pipe.

Figure 23:
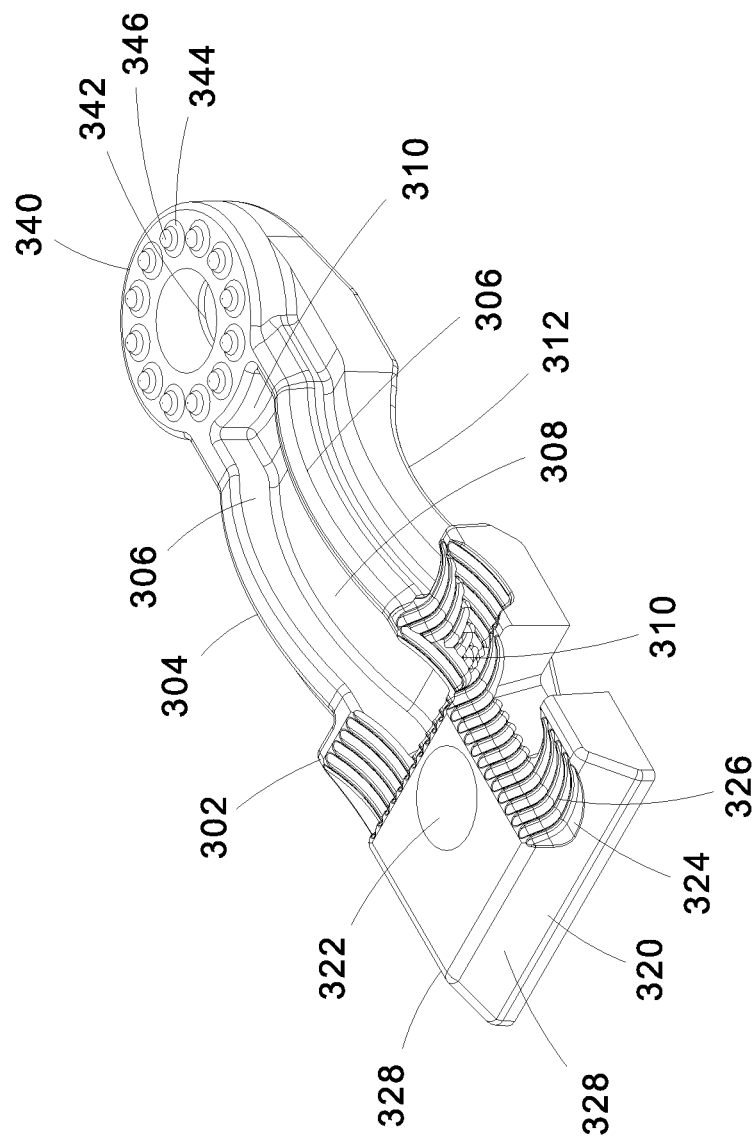
FIG. 23 is a top perspective view of the main body of the grounding pipe clamp of FIG. 21.
Figure 24:
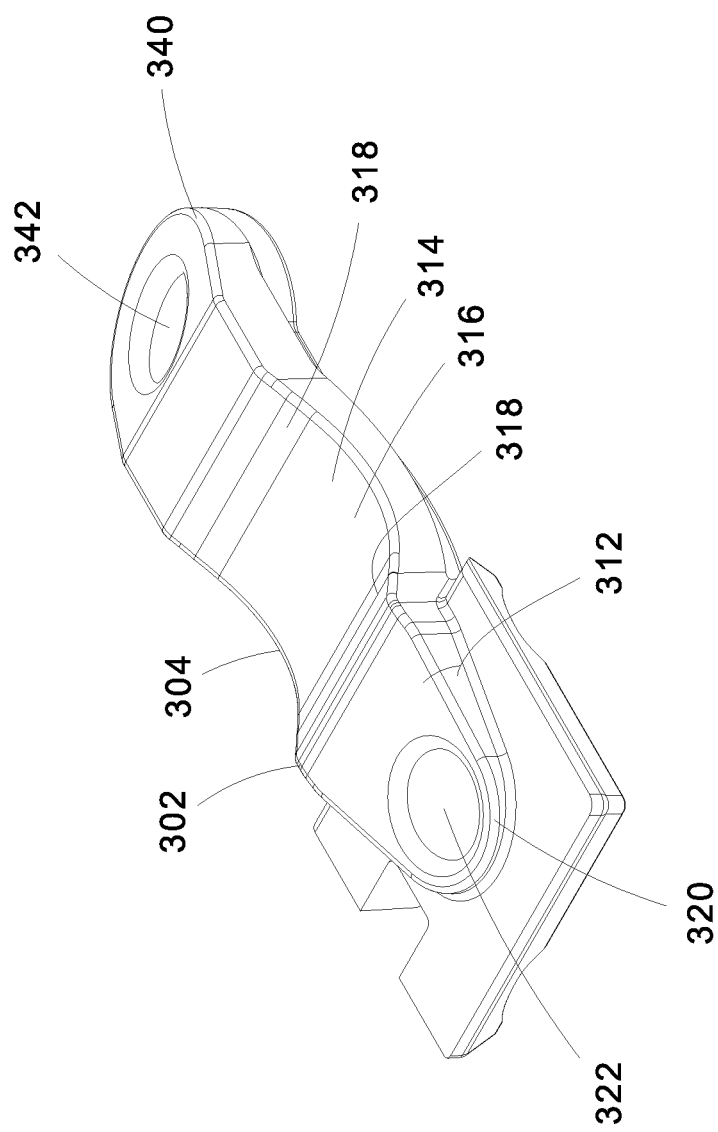
FIG. 24 is a bottom perspective view of the main body of the grounding pipe clamp of FIG. 23.

FIGS. 23 and 24 illustrate the main body 302 of the grounding pipe clamp 300. The main body 302 includes a middle portion 304 with two reinforcing ribs 306. The reinforcing ribs 306 form a slot 308 with an end 310 that receives the tip 372 at the end 366 of the clamping pad 360 when a small diameter conductor is connected in a parallel configuration. The underside 312 of the middle portion 304 has one center segment 314 of cylindrical surface 316, and multiple pairs of cylindrical surface segments 318 to enable the main body 302 to receive a range of pipe diameters. The center cylindrical surface segment conforms to the outer diameter of smallest size pipe. The subsequent pairs of cylindrical surface segments conform to larger size pipes. The cylindrical segments ensure proper locating of the pipes against the main body, and sufficient contact area for efficient ground conductivity.

The first end portion 320 of the main body 302 includes a hole 322, grooves 324 with ribs 326, and an angular bearing surface 328. The hole 322 receives a first leg 352 of the U-bolt 350. The second end portion 340 of the main body 302 has a hole 342 and a circular pattern of miniature cones 344 with round tops 346. The hole 342 receives a second leg 354 of the U-bolt 350. The miniature cones 344 prevent the hex nut 380 from inadvertently loosening up.

Figure 25:
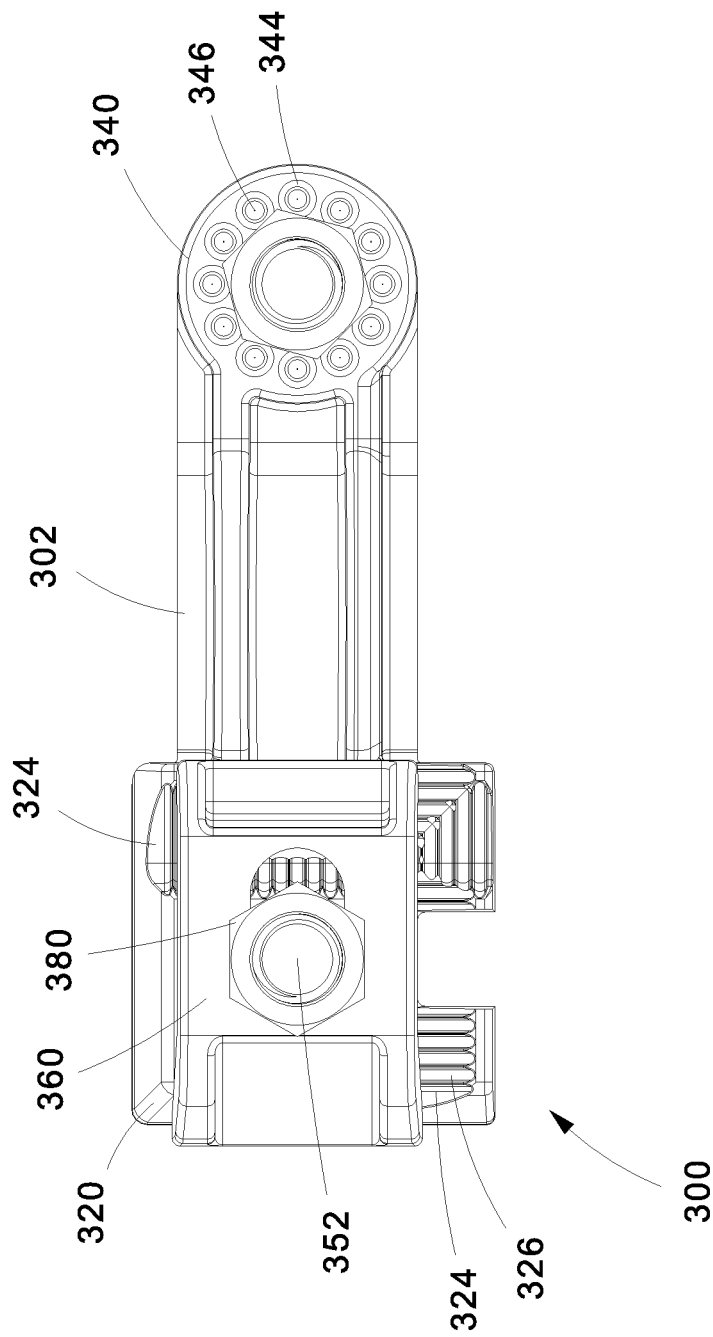
FIG. 25 is a top view of the grounding pipe clamp of FIG. 21.

When the hex nut 380 is tightened against the second end 322 of the main body 302, the hex nut corners rotate over the miniature cones 344 and fall within two adjacent miniature cones (see FIG. 25). Since a certain amount of force is required to move the hex nut corners over the miniature cones 344, the hex nut 380 cannot be unscrewed by itself.

Figure 26B:
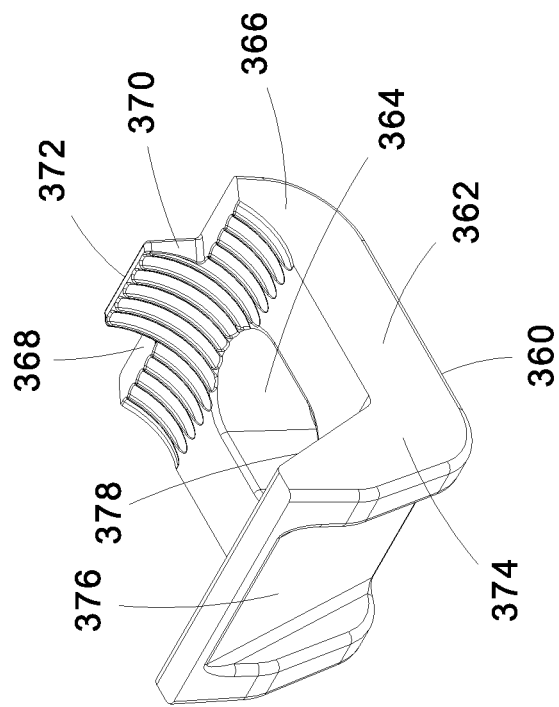
FIG. 26B is a bottom perspective view of the clamping pad of FIG. 26A.
Figure 26A:
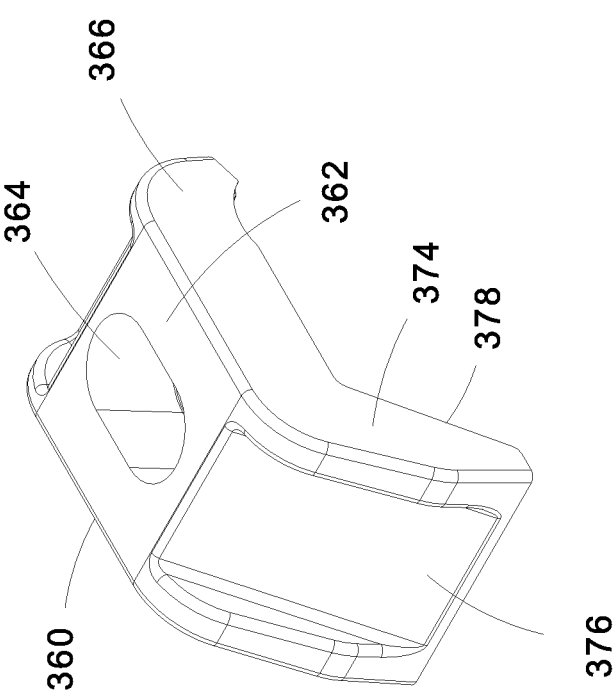
FIG. 26A is a top perspective view of the clamping pad of the grounding pipe clamp of FIG. 21.

FIGS. 26A and 26B illustrate the clamping pad 360. The clamping pad 360 includes a middle portion 362 with an oblong slot 364, a curved end portion 366, and an angular end portion 374. The curved end portion 366 includes two corner reliefs 368 defining a short flange 370 with a tip 372. The angular end portion 374 includes a longer flange 376 and an inner bearing surface 378. The inner surface of the curved end portion 366 includes a pattern of fine ribs. Both the curved end portion 366 and the angular end portion 374 have core-outs that form reinforcing ribs. The angular bearing surfaces of the first end of the main body and the clamping pad engage when the grounding pipe clamp is securing a pipe and grounding conductor (see FIG. 27).

Figure 27:
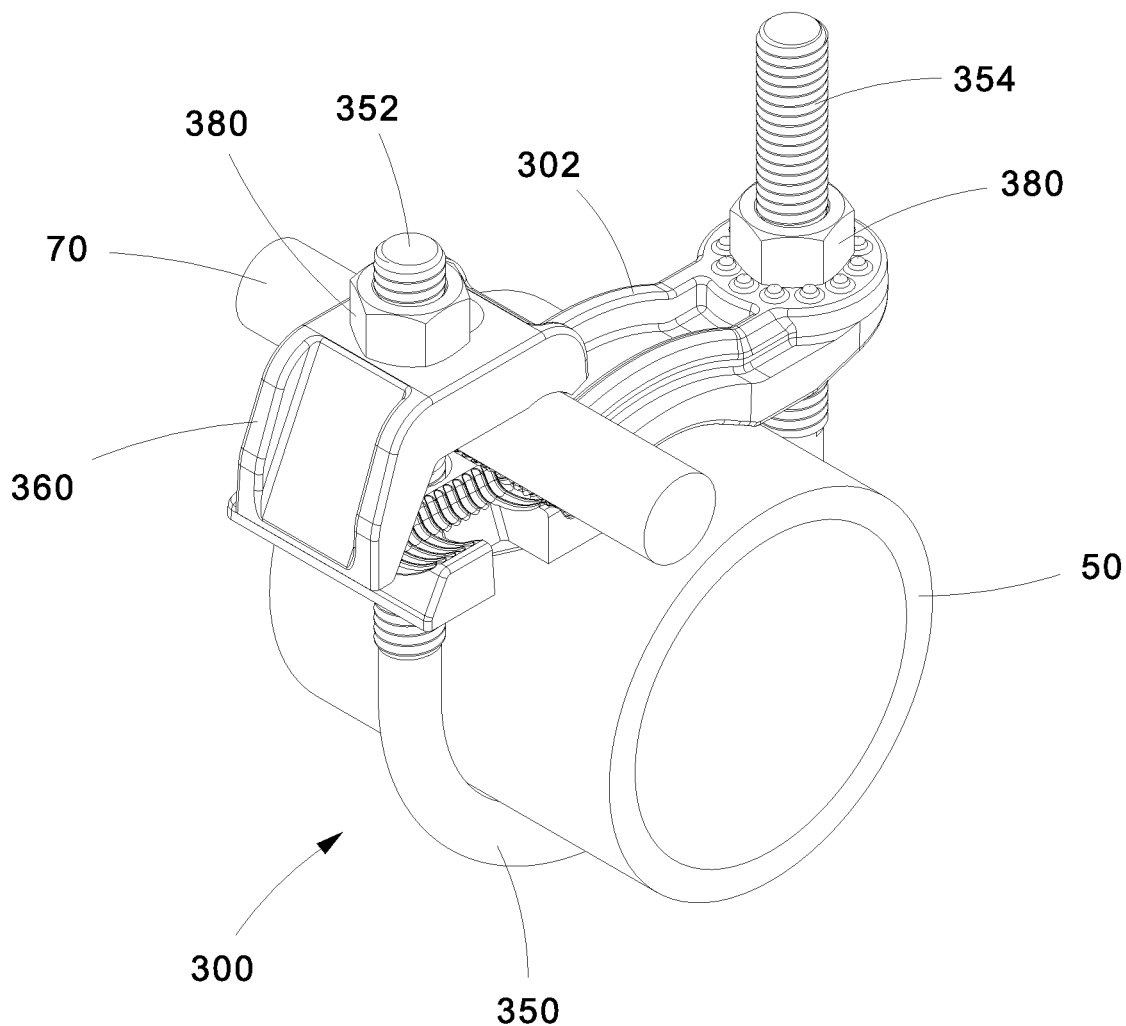
FIG. 27 is a perspective view of the grounding pipe clamp of FIG. 21 connecting a grounding conductor parallel to a pipe.
Figure 28:
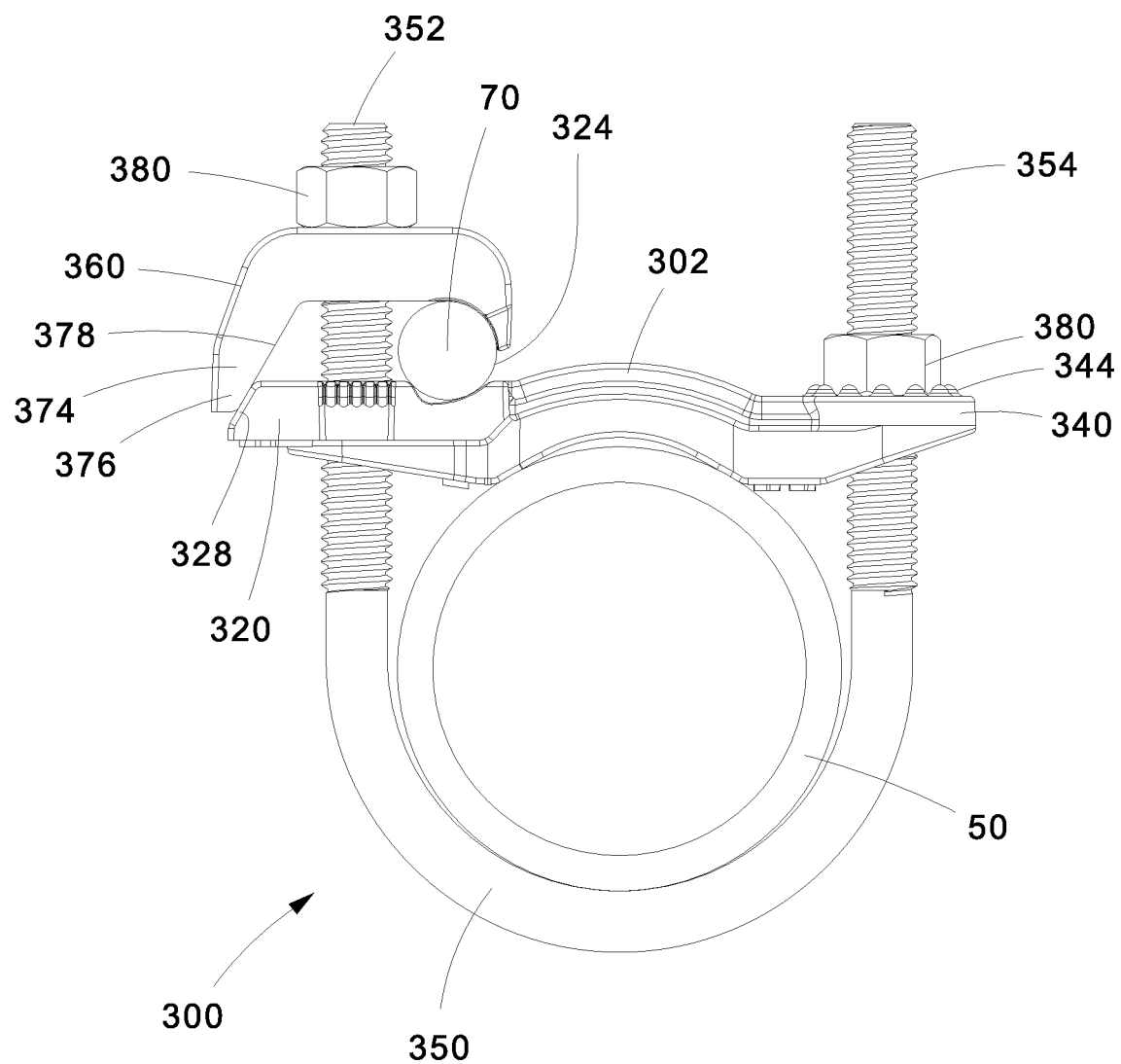
FIG. 28 is a side view of the grounding pipe clamp of FIG. 21 connecting a grounding conductor parallel to a pipe.
Figure 29:
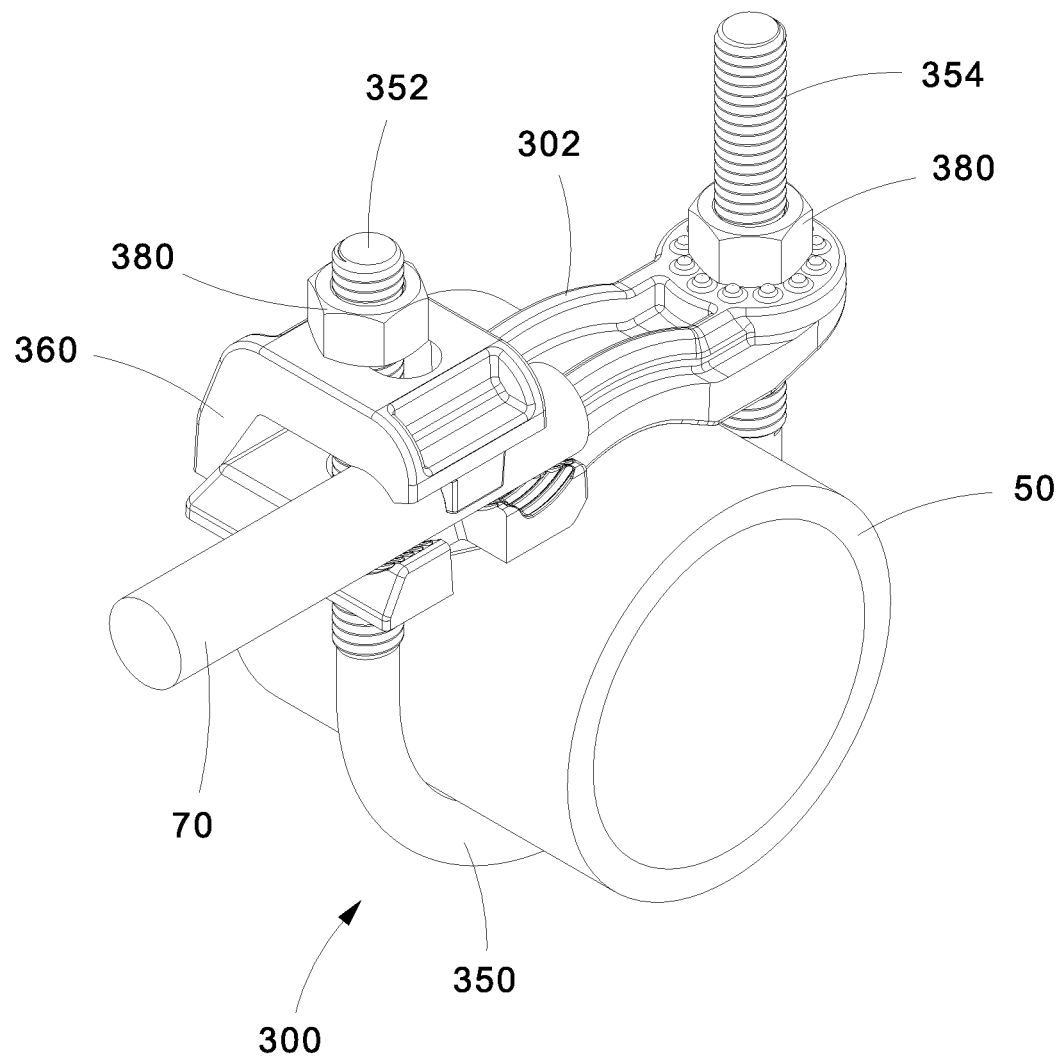
FIG. 29 is a perspective view of the grounding pipe clamp of FIG. 21 connecting a grounding conductor perpendicular to a pipe.
Figure 30:
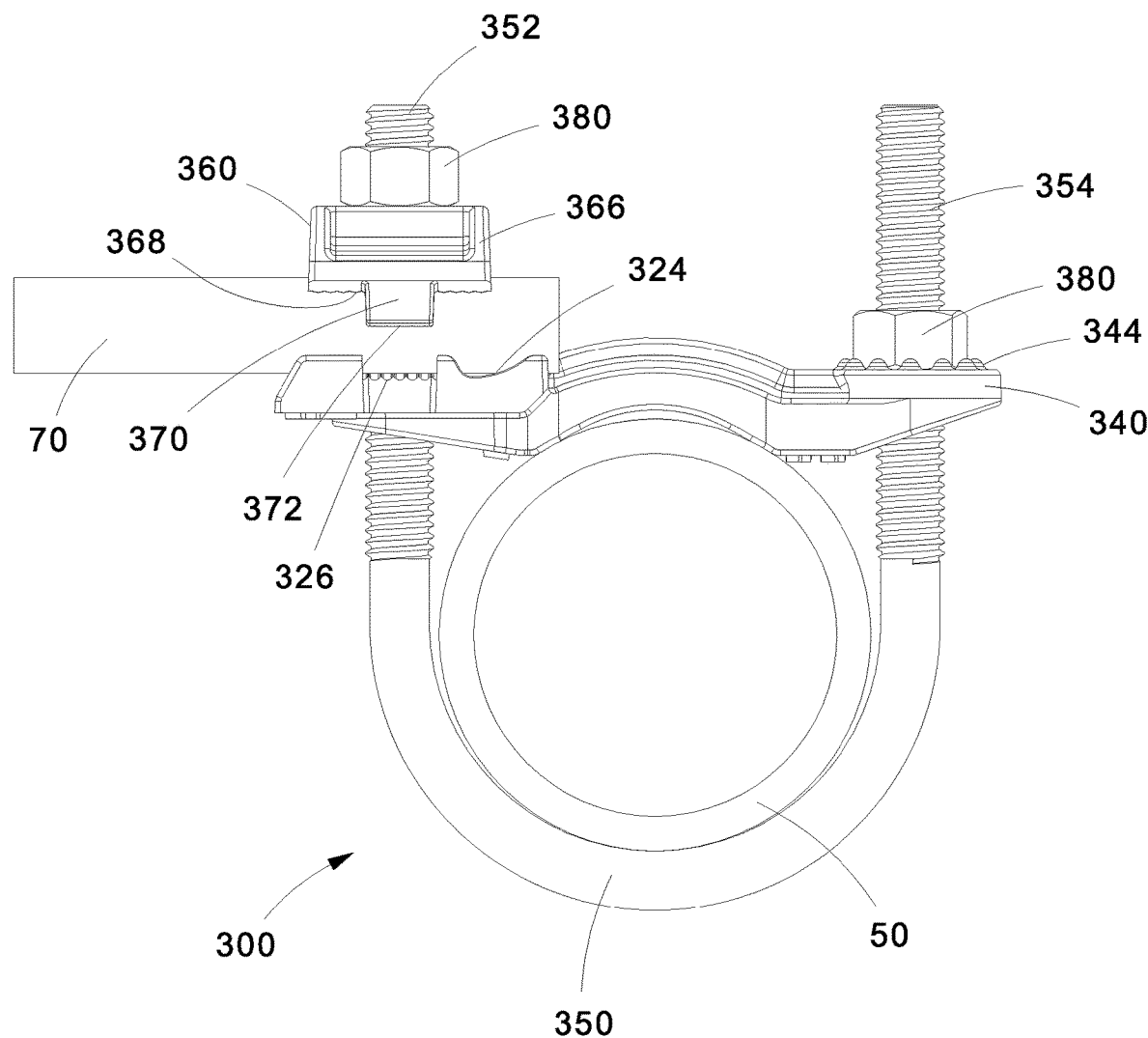
FIG. 30 is a side view of the grounding pipe clamp of FIG. 29 connecting grounding conductor perpendicular to a pipe.

FIGS. 27-30 illustrate different configurations of connecting a grounding connector to the pipe by the grounding pipe clamp. The grounding pipe clamp is capable of receiving a wide range of conductor sizes. FIGS. 27 and 28 illustrate a grounding conductor that is parallel to the pipe. FIGS. 29 and 30 illustrate a grounding conductor that is perpendicular to the pipe. The clamping pad is positioned with the end having the shorter flange extending over the grounding conductor.

Figure 31:
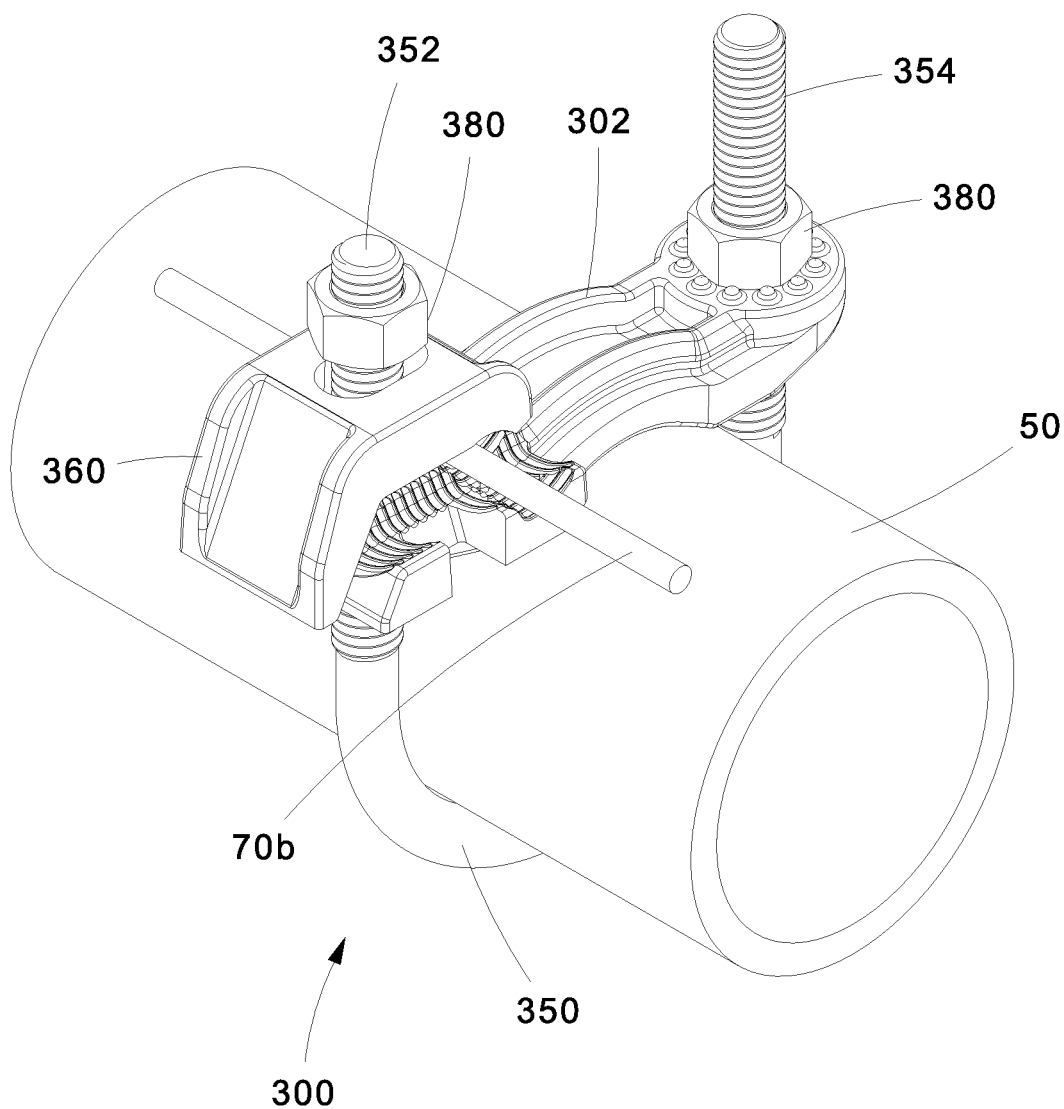
FIG. 31 is a perspective view of the grounding pipe clamp of FIG. 21 connecting an alternative size grounding conductor parallel to a pipe.
Figure 32:
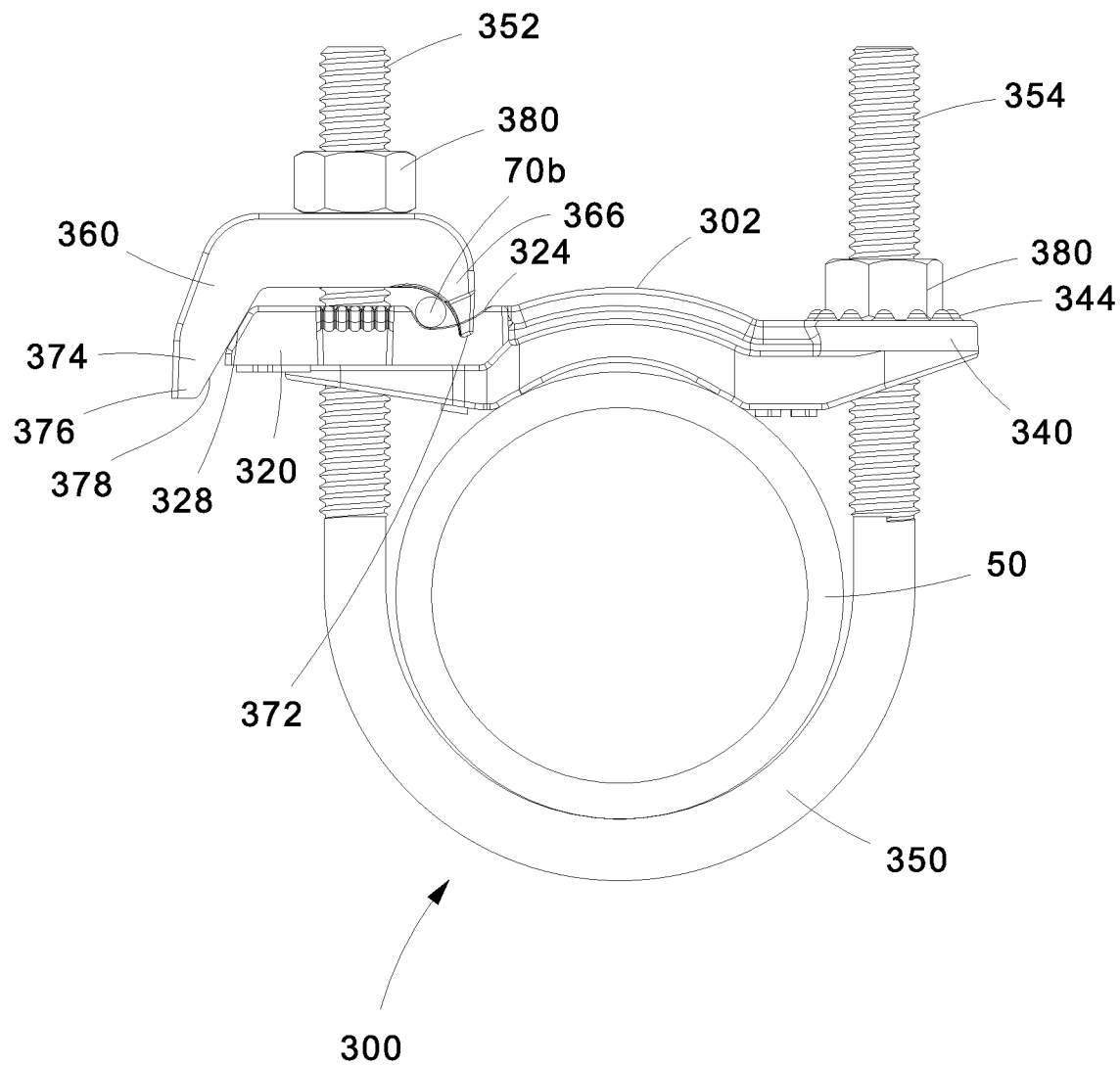
FIG. 32 is a side view of the grounding pipe clamp of FIG. 31 connecting the alternative size grounding conductor parallel to the pipe.
Figure 33:
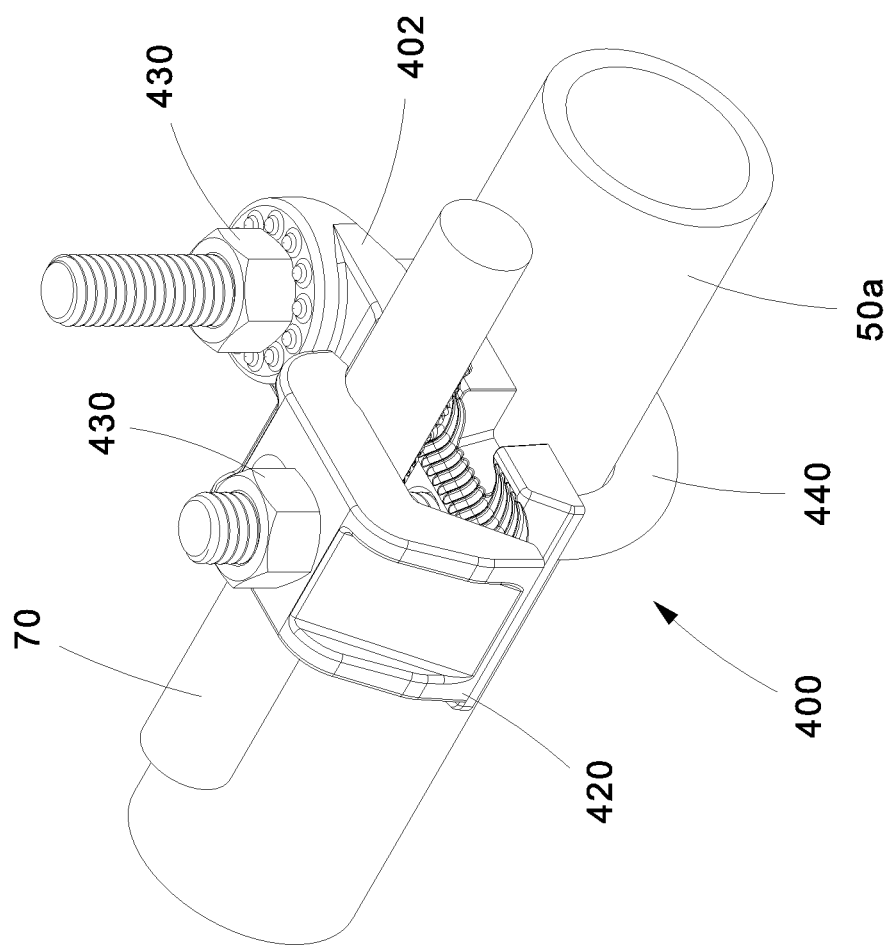
FIG. 33 is an alternative grounding pipe clamp for smaller diameter pipes with a grounding conductor connected thereto.
Figure 34:
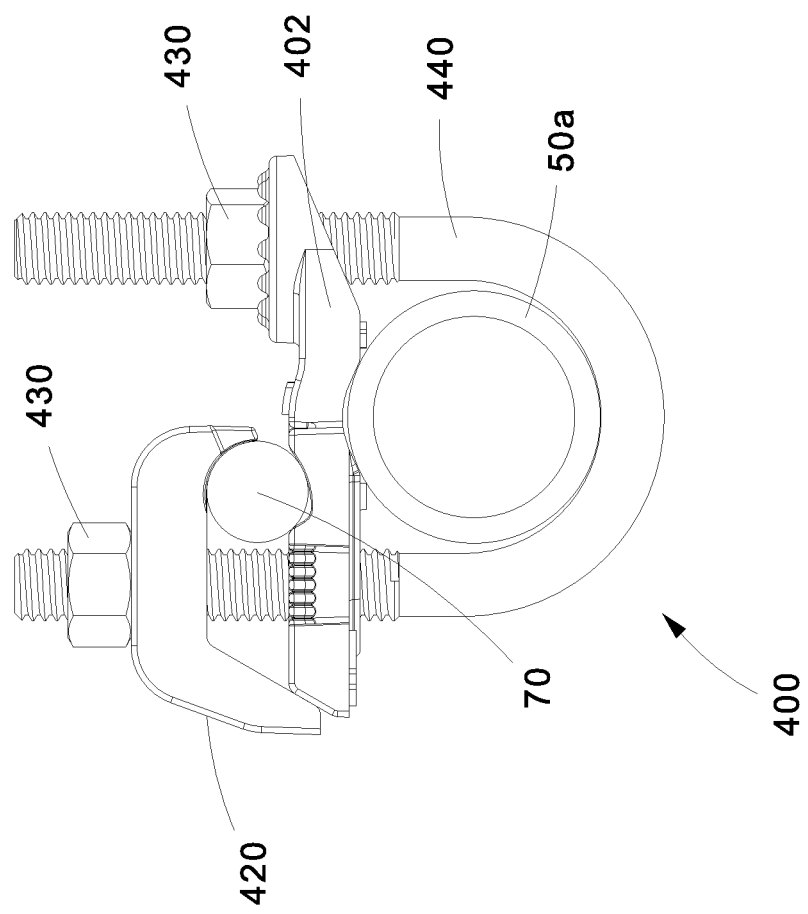
FIG. 34 is a side view of the grounding pipe clamp, pipe, and attached grounding conductor of FIG. 33.
Figure 35:
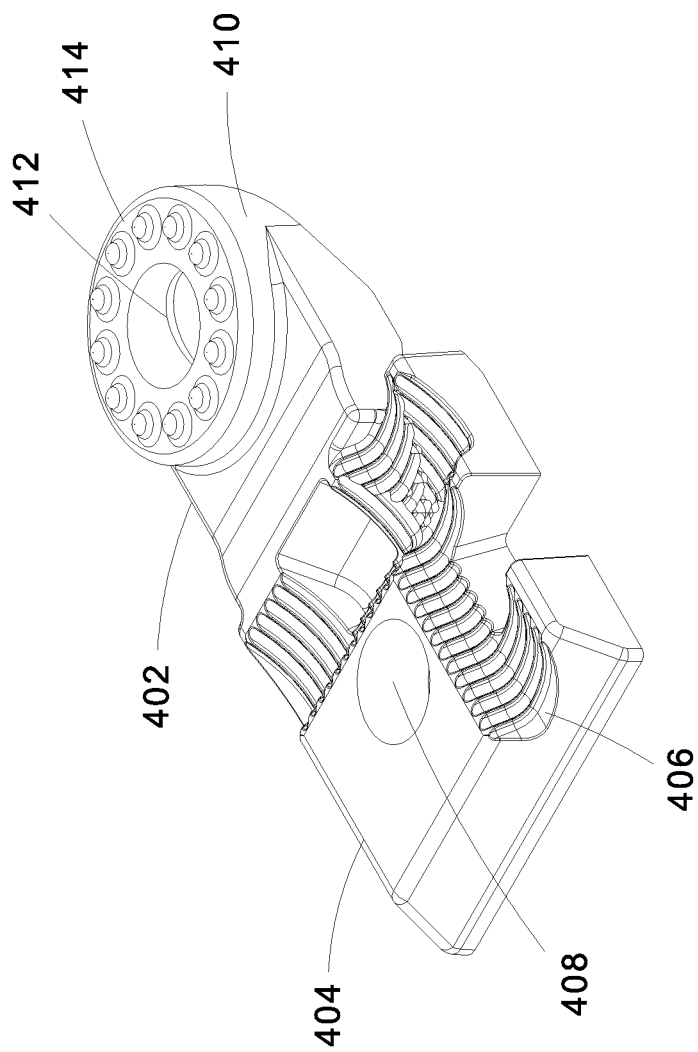
FIG. 35 is a top perspective view of the main body of the grounding pipe clamp of FIG. 33.
Figure 36:
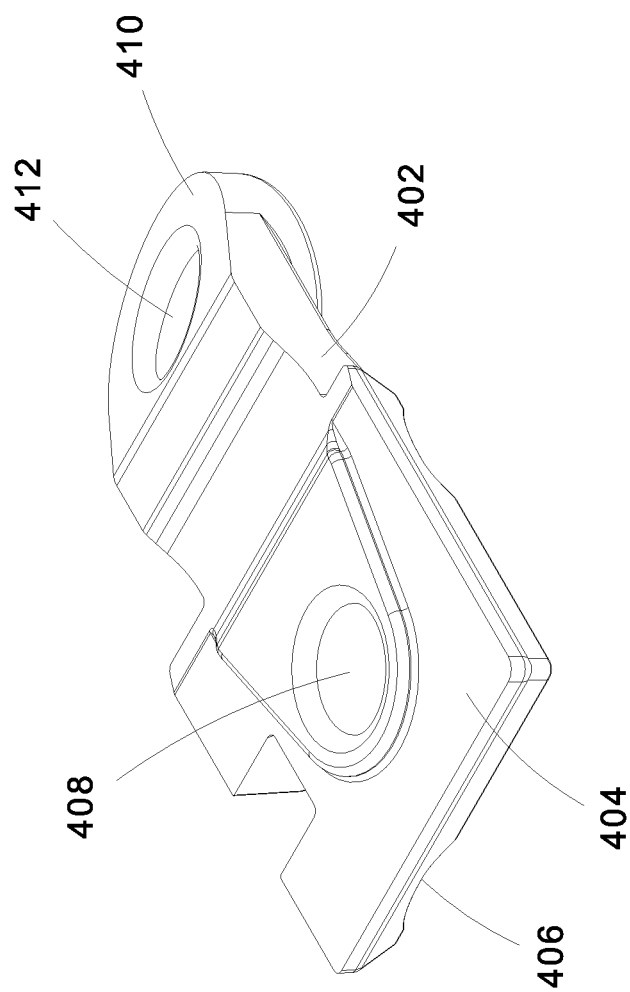
FIG. 36 is a bottom perspective view of the main body of the grounding pipe clamp of FIG. 35.
Figure 37:
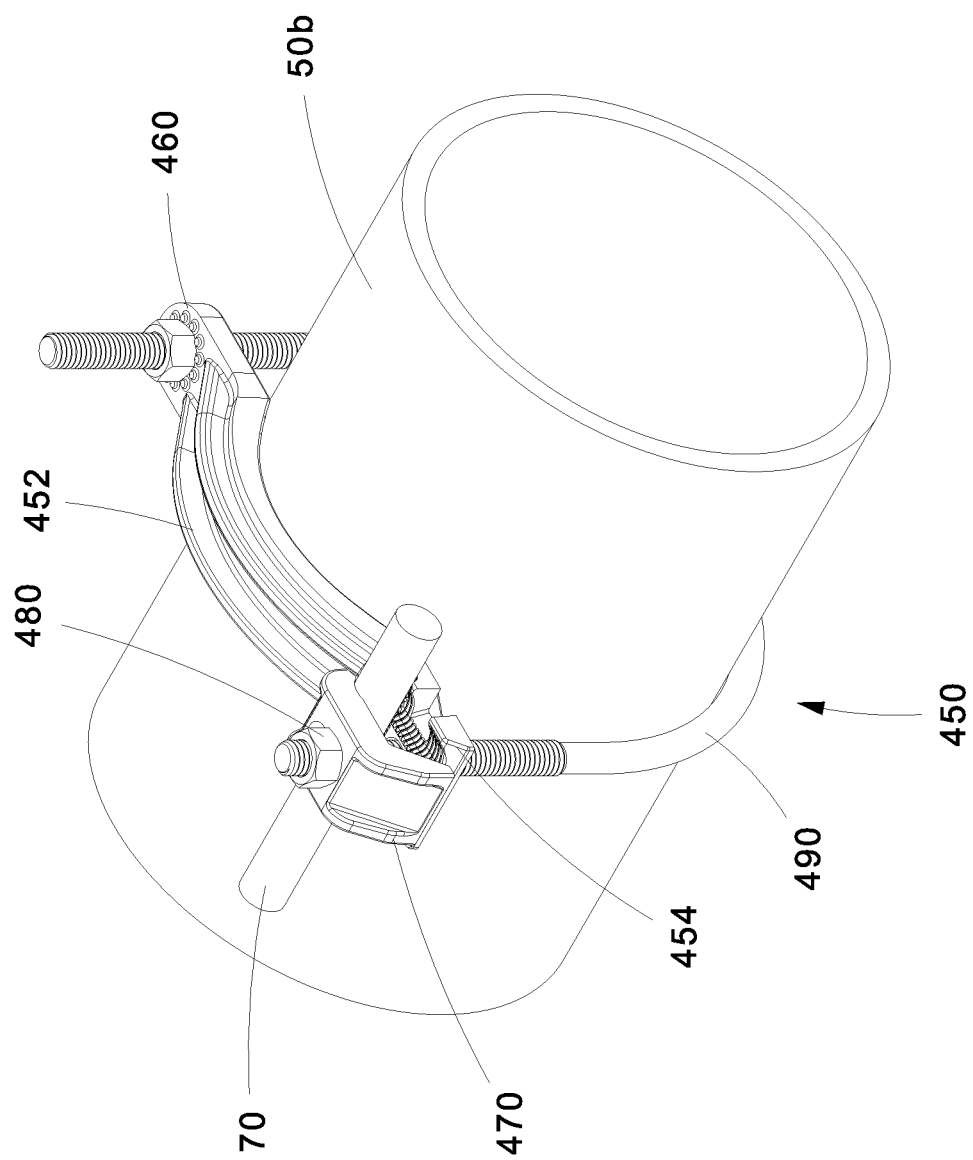
FIG. 37 is an alternative grounding pipe clamp for large diameter pipes with grounding conductors connected thereto.
Figure 38:
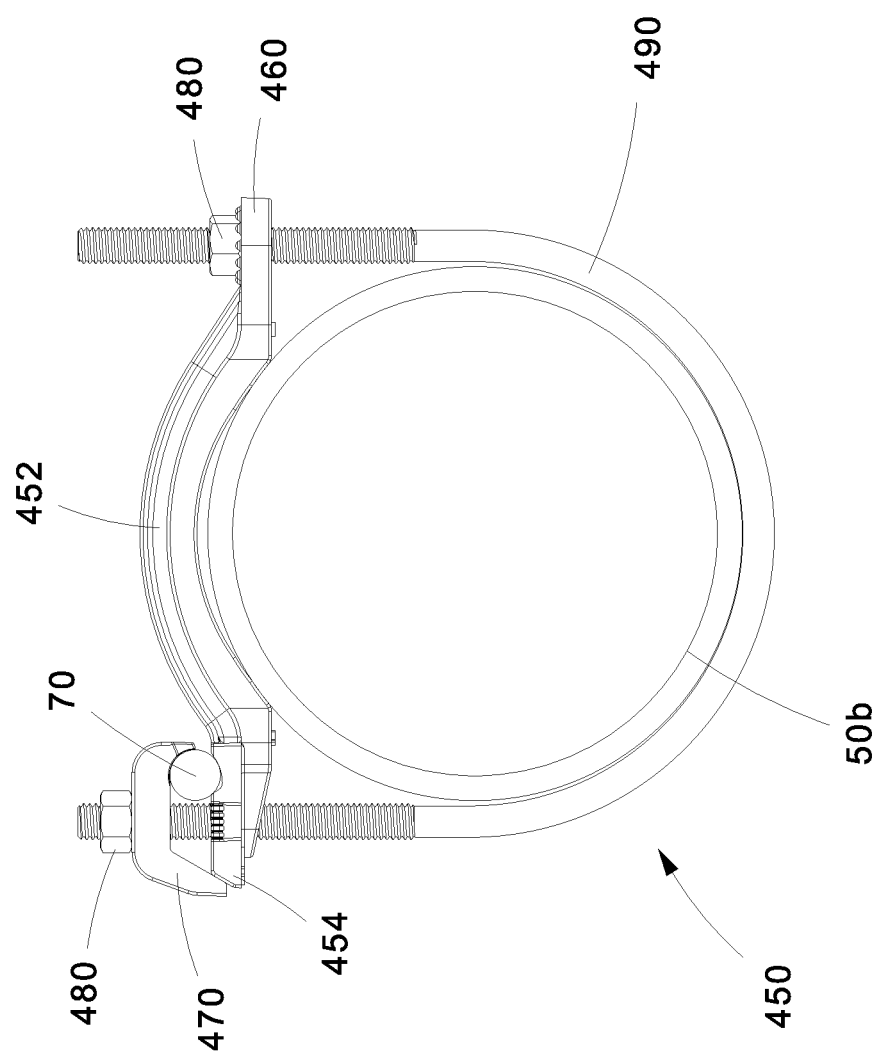
FIG. 38 is a side view of the grounding pipe clamp, pipe, and attached grounding conductor of FIG. 37.
Figure 39:
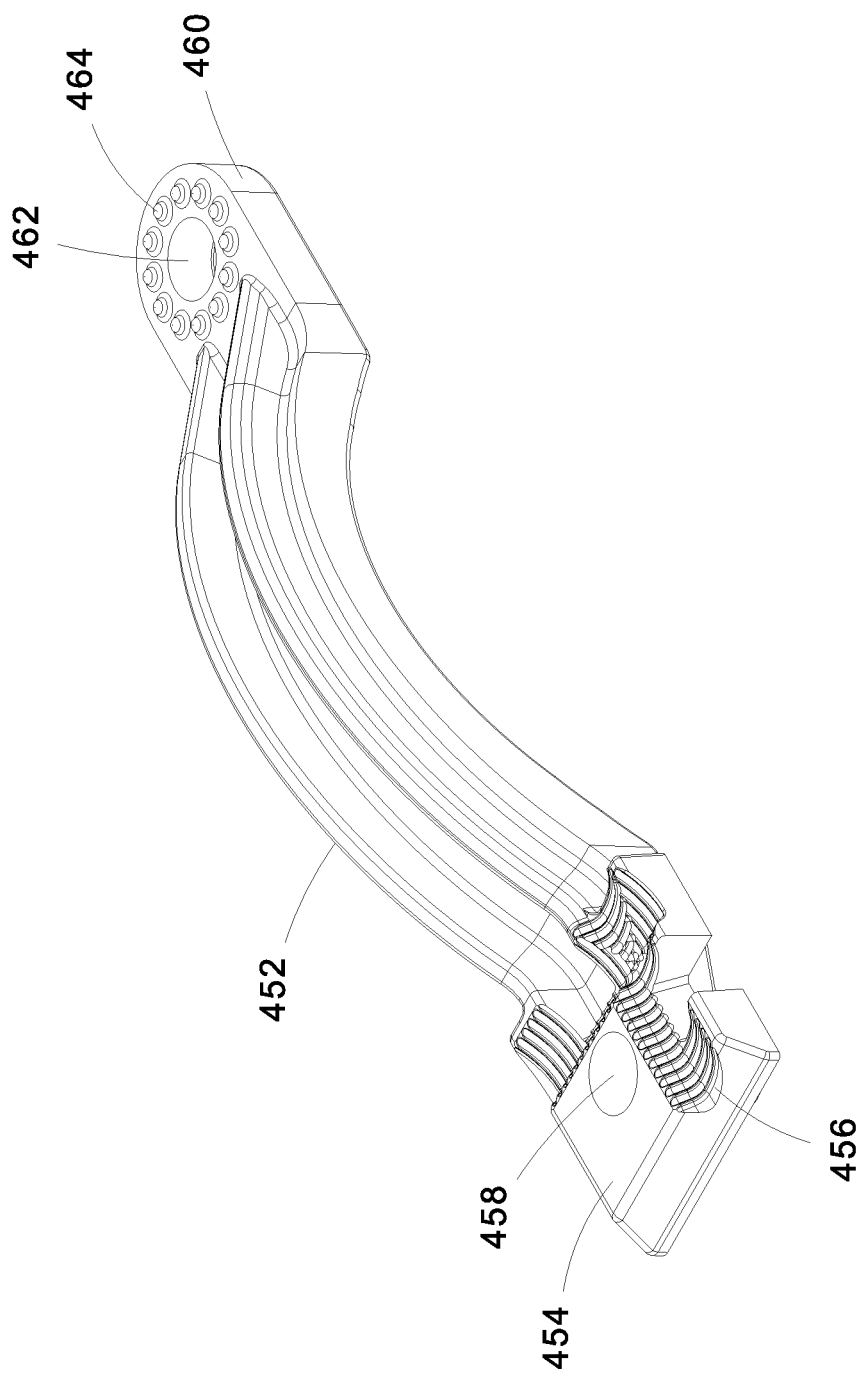
FIG. 39 is a top perspective view of the main body of the grounding pipe clamp of FIG. 37.
Figure 40:
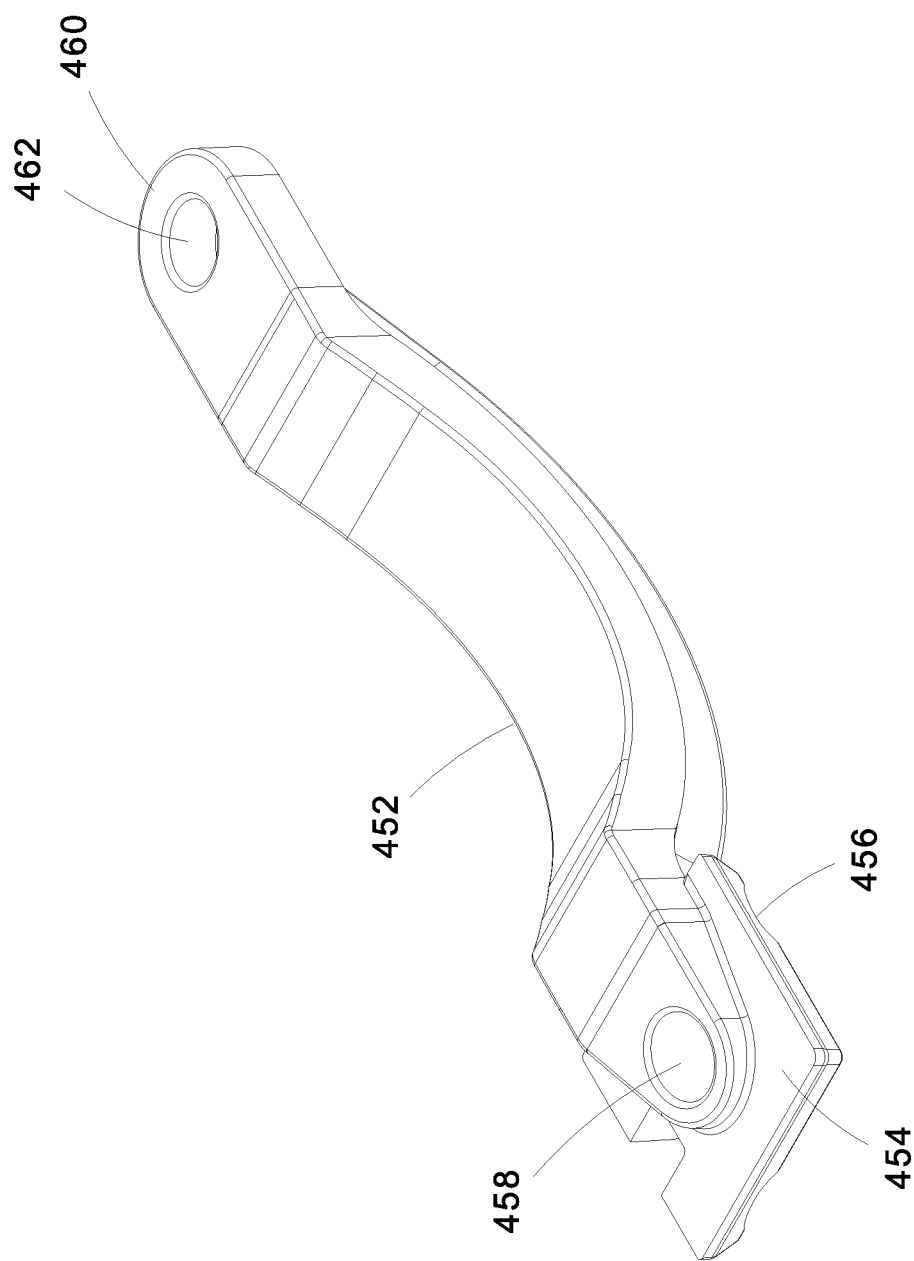
FIG. 40 is a bottom perspective view of the main body of the grounding pipe clamp of FIG. 37.

FIGS. 31 and 32 illustrate the grounding pipe clamp securing a small diameter conductor. The clamping pad slides up or down to accommodate various conductor sizes.

Since the angular sliding forces a lateral movement, the clamping pad has an oblong shaped slot to enable lateral movement.

FIGS. 33-36 illustrate an alternative grounding pipe clamp 400 designed to be used with pipes 50a having a small diameter. The grounding pipe clamp 400 includes a main body 402, a clamping pad 420, hex nuts 430, and a U-bolt 440. The main body 402 includes a first end 404 and a second end 410. The first end 404 includes grooves 406 formed to receive the grounding conductors and a hole 408. The second end 410 includes a hole 412 surrounded by a circular pattern of cones 414. The middle portion of the main body 402 has been reduced to accommodate the smaller diameter pipe 50a. The clamping pad 420 secures the grounding conductor to the grounding pipe clamp 400.

FIGS. 37-40 illustrate an alternative grounding pipe clamp 450 designed to be used with pipes 50b having a large diameter. The grounding pipe clamp 450 includes a main body 452, a clamping pad 470, hex nuts 480, and a U-bolt 490. The main body 452 includes a first end 454 and a second end 460. The first end 454 includes grooves 456 formed to receive the grounding conductors and a hole 458. The second end 460 includes a hole 462 surrounded by a circular pattern of cones 464. The middle portion of the main body 452 has been enlarged to accommodate the larger diameter pipe 50b. The clamping pad 470 secures the grounding conductor to the grounding pipe clamp 450.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A grounding pipe clamp for accommodating various attachment configurations for a range of conductor sizes, the grounding pipe clamp comprising:
   a bolt having a first leg and a second leg;
   a main body having a first end portion, a middle portion, and a second end portion, the first end portion has a slot, the slot receives the first leg of the bolt, the second end portion has a L-shaped cutout, the L-shaped cutout receives the second leg of the bolt to secure a pipe between the main body and the bolt, wherein the first end portion of the main body and the second end portion of the main body have base pads with two grooves positioned at right angles with respect to each other, wherein each groove has a pattern of ribs for supporting conductors positioned on the main body; and
   clamping pads secured to the first leg of the bolt and the second leg of the bolt, the clamping pads secure conductors positioned on the main body.

2. The grounding pipe clamp of claim 1, wherein the base pads further comprising angular bearing surfaces positioned on a side opposite of the grooves.

3. The grounding pipe clamp of claim 1, the middle portion of the main body includes two reinforcing ribs that form a slot in the middle portion.

4. The grounding pipe clamp of claim 1, further comprising hex nuts positioned on the first leg and the second leg of the bolt for securing the clamping pads to the bolt.

5. The grounding pipe clamp of claim 1, wherein the clamping pads are positioned over the first end portion and the second end portion of the main body to allow the conductors to be parallel to the pipe.

6. The grounding pipe clamp of claim 1, wherein the clamping pads are positioned over the first end portion and the second end portion of the main body to allow the conductors to be perpendicular to the pipe.

7. The grounding pipe clamp of claim 1, wherein the clamping pads are positioned over the first end portion and the second end portion of the main body to allow one conductor to be parallel to the pipe and one conductor to be perpendicular to the pipe.

8. The grounding pipe clamp of claim 1, wherein the clamping pads have a middle portion, a first end, and a second end, the middle portion includes a slot for receiving one of the first and second legs of the bolt.

9. The grounding pipe clamp of claim 8, wherein the second end of the clamping pad has a long flange with an angular end and an inner bearing surface, the long flange slides along an angled surface of a base pad of the main body.

10. A grounding pipe clamp for accommodating a range of conductor sizes, the grounding pipe clamp comprising:
    a bolt with a first leg and a second leg;
    a main body with a first end portion having a hole for receiving the first leg of the bolt, a middle portion with reinforcing ribs, and a second end portion having a hole for receiving the second leg of the bolt, wherein the first end portion of the main body further comprising grooves with ribs and an angular bearing surface;
    a clamping pad secured to the first leg of the bolt and positioned over the first end portion of the main body for securing conductors positioned on the main body; and
    hex nuts secured to the first leg and the second leg of the bolt,
    whereby a pipe is positioned between the bolt and the main body and is secured thereto by the clamping pad and the hex nuts.

11. The grounding pipe clamp of claim 10, wherein the reinforcing ribs of the middle portion form a slot with an end that receives a tip at an end of the clamping pad.

12. The grounding pipe clamp of claim 10, wherein the middle portion further comprising an underside with a center segment having a cylindrical surface and multiple pairs of cylindrical surface segments for enabling the main body to receive a range of pipe diameters.

13. The grounding pipe clamp of claim 10, wherein the second end portion of the main body further comprising a circular pattern of cones with round tops, wherein the cones prevent the hex nut from loosening.

14. The grounding pipe clamp of claim 10, wherein the clamping pad is positioned over the first end portion of the main body to allow the conductor to be parallel to the pipe.

15. The grounding pipe clamp of claim 10, wherein the clamping pad is positioned over the first end portion the main body to allow the conductor to be perpendicular to the pipe.

16. A grounding pipe clamp for accommodating various attachment configurations for a range of conductor sizes, the grounding pipe clamp comprising:
    a bolt having a first leg and a second leg;
    a main body having a first end portion, a middle portion, and a second end portion, the first end portion has a slot, the slot receives the first leg of the bolt, the second end portion has a L-shaped cutout, the L-shaped cutout receives the second leg of the bolt to secure a pipe between the main body and the bolt;

clamping pads secured to the first leg of the bolt and the second leg of the bolt, the clamping pads secure conductors positioned on the main body;

wherein the clamping pads have a middle portion, a first end, and a second end, the middle portion includes a slot for receiving one of the first and second legs of the bolt; and wherein the first end of the clamping pad is curved with a short flange having a tip at a distal end and an inner side having a plurality of ribs, the short flange pushes the conductor into grooves on a base pad of the main body.

17. A grounding pipe clamp for accommodating a range of conductor sizes, the grounding pipe clamp comprising:

a bolt with a first leg and a second leg;

a main body with a first end portion having a hole for receiving the first leg of the bolt, a middle portion with reinforcing ribs, and a second end portion having a hole for receiving the second leg of the bolt;

a clamping pad secured to the first leg of the bolt and positioned over the first end portion of the main body for securing conductors positioned on the main body, wherein the clamping pad includes a curved end portion, a middle portion with a slot, and an angular end portion; wherein the curved end portion includes a short flange with a tip and an inner surface with ribs, and the angular end portion includes a long flange and an inner bearing surface; and hex nuts secured to the first leg and the second leg of the bolt, whereby a pipe is positioned between the bolt and the main body and is secured thereto by the clamping pad and the hex nuts.

* * * * *